(12) United States Patent
Boshra

(10) Patent No.: US 7,616,787 B2
(45) Date of Patent: Nov. 10, 2009

(54) METHODS FOR FINGER BIOMETRIC PROCESSING AND ASSOCIATED FINGER BIOMETRIC SENSORS

(75) Inventor: Michael Boshra, Indialantic, FL (US)

(73) Assignee: Authentec, Inc., Melbourne, FL (US)

( * ) Notice: Subject to any disclaimer, the term of this patent is extended or adjusted under 35 U.S.C. 154(b) by 1036 days.

(21) Appl. No.: 10/956,491

(22) Filed: Oct. 1, 2004

(65) Prior Publication Data

US 2005/0129291 A1   Jun. 16, 2005

Related U.S. Application Data

(60) Provisional application No. 60/514,059, filed on Oct. 24, 2003, provisional application No. 60/507,793, filed on Oct. 1, 2003.

(51) Int. Cl.
  *G06K 9/00* (2006.01)
(52) U.S. Cl. ..................... 382/124
(58) Field of Classification Search ........ None
  See application file for complete search history.

(56) References Cited

U.S. PATENT DOCUMENTS

| | | | | |
|---|---|---|---|---|
| 5,067,162 | A | | 11/1991 | Driscoll, Jr. et al. ............ 382/5 |
| 5,251,271 | A | * | 10/1993 | Fling .......................... 382/162 |
| 5,325,442 | A | | 6/1994 | Knapp .......................... 382/4 |
| 5,351,303 | A | | 9/1994 | Willmore ....................... 382/2 |
| 5,613,014 | A | * | 3/1997 | Eshera et al. ................. 382/124 |
| 5,689,576 | A | | 11/1997 | Schneider et al. ........... 382/124 |
| 5,737,439 | A | | 4/1998 | Lapsley et al. .............. 382/115 |
| 5,909,501 | A | | 6/1999 | Thebaud ..................... 382/124 |
| 5,940,526 | A | | 8/1999 | Setlak et al. ................ 382/124 |
| 5,953,441 | A | | 9/1999 | Setlak ......................... 382/124 |
| 6,118,890 | A | | 9/2000 | Senior ......................... 382/125 |
| 6,134,340 | A | | 10/2000 | Hsu et al. .................... 382/124 |
| 6,241,288 | B1 | | 6/2001 | Bergenek et al. ............. 283/67 |
| 6,289,114 | B1 | | 9/2001 | Mainguet .................... 382/124 |

(Continued)

FOREIGN PATENT DOCUMENTS

EP   0 918 300   5/1999

OTHER PUBLICATIONS

Bernd Heisele et al., Department of Environmental Engineering, University of Siena, Siena, Italy, "Component-based Face Detection", 2001 IEEE, No. 0-7695-1272-0, pp. I-657 thru I-662.

(Continued)

*Primary Examiner*—Bhavesh M Mehta
*Assistant Examiner*—Alex Liew
(74) *Attorney, Agent, or Firm*—Allen, Dyer, Doppelt, Milbrath & Gilchrist, P.A.

(57) ABSTRACT

A method is for processing a plurality of finger biometric enrollment data sets that accounts for uncertainty in alignment between finger biometric enrollment data sets. The method may include generating a respective estimated physical transformation between each pair of finger biometric enrollment data sets, and generating a respective uncertainty for each estimated physical transformation. The method may also include associating the respective estimated physical transformation and the uncertainty for each estimated physical transformation with each pair of finger biometric enrollment data sets to define a logical finger biometric enrollment graph. The logical finger biometric enrollment graph is readily used for subsequent accurate matching in either touch sensor applications or slide sensor applications.

24 Claims, 15 Drawing Sheets

U.S. PATENT DOCUMENTS

| | | | | |
|---|---|---|---|---|
| 6,327,376 | B1 | 12/2001 | Harkin | 382/124 |
| 6,483,929 | B1 | 11/2002 | Murakami et al. | 382/115 |
| 6,546,122 | B1* | 4/2003 | Russo | 382/125 |
| 6,560,352 | B2 | 5/2003 | Rowe et al. | 382/115 |
| 7,027,622 | B2* | 4/2006 | Pengwu | 382/118 |
| 2002/0041700 | A1 | 4/2002 | Therbaud | 382/124 |
| 2002/0067845 | A1 | 6/2002 | Griffis | 382/107 |
| 2002/0138768 | A1 | 9/2002 | Murakami et al. | 713/202 |
| 2003/0002718 | A1 | 1/2003 | Hamid | 382/124 |
| 2003/0123714 | A1* | 7/2003 | O'Gorman et al. | 382/124 |
| 2003/0126448 | A1 | 7/2003 | Russo | 713/186 |
| 2003/0169910 | A1 | 9/2003 | Reisman et al. | 382/124 |
| 2004/0131237 | A1* | 7/2004 | Machida | 382/124 |

OTHER PUBLICATIONS

Bazen et al., *A Correlation-Based Fingerprint Verification System*, Proceedings of Workshop on Circuits Systems and Signal Processing, pp. 205-213, 2000.

Kovacs-Vanja, *A Fingerprint Verification System Based on Triangular Matching and Dynamic Time Warping*, IEEE Transactions on Pattern Analysis and Machine Intelligence, vol. 22, No. 11, Nov. 2000, pp. 1266-1276.

Coetzee et al., *Fingerprint Recognition in Low Quality Images*, Pattern Recognition, vol. 26, No. 10, pp. 1441-1460, 1993.

Halici et al., *Fingerprint Classification through Self-Organizing Feature Maps Modified to Treat Uncertainties*, Proceedings of the IEEE, vol. 84, No. 10, pp. 1497-1512, Oct. 1996.

Cappelli et al., *Fingerprint Classification by Directional Image Partitioning*, IEEE Transactions on Pattern Analysis and Machine Intelligence, vol. 21, No. 5, pp. 402-421, May 1999.

Almansa et al., *Fingerprint Enhancement by Shape Adaptation of Scale-Shape Operators with Automatic Scale Selection*, IEEE Transactions on Image Processing, vol. 9, No. 12, pp. 2027-2042, Dec. 2000.

Hong et al., *Fingerprint Image Enhancement: Algorithm and Performance Evaluation*, IEEE Transactions on Pattern Analysis, vol. 20, No. 8, pp. 777-789, Aug. 1998.

O'Gorman et al., *An Approach to Fingerprint Filter Design*, Pattern Recognition, vol. 22, No. 1, pp. 29-38, 1989.

Ratha et al., *Image Mosiacing for Rolled Fingerprint Construction*, 14th International Conference on Pattern Recognition-Vol. 2, Aug. 16-20, 1998, Brisbane, Australia.

Yau et al., *On Fingerprint Template Synthesis*, Proceedings of Sixth International Conference on Control, Automation, Robotics and Vision (ICARCV 2000), Singapore. Dec. 5-8, 2000.

Brown, *A Survey of Image Registration Techniques*, Department of Computer Science, Columbia University, ACM Computing Surveys, vol. 24, No. 4, Dec. 1992.

Jain et al., *Fingerprint Mosaicking*, Proc. International Conference on Acoustic Speech and Signal Processing (ICASSP), Orlando, Florida, May 13-17, 2002.

Maltoni et al., *Handbook of Fingerprint Recognition*, Section 2.5, Touch Versus Sweep, pp. 65-69, Springer-Verlag, New York, 2003.

* cited by examiner

FIG. 22C  SCORE = 200

SCORE = 60          SCORE = 46          SCORE = 75

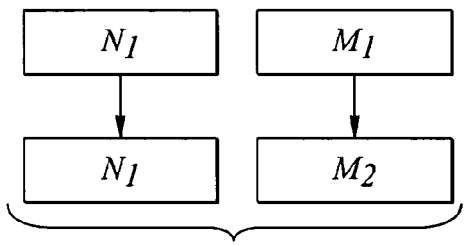
FIG. 23A
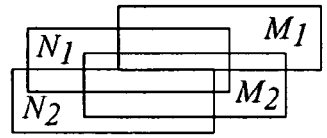
FIG. 23B
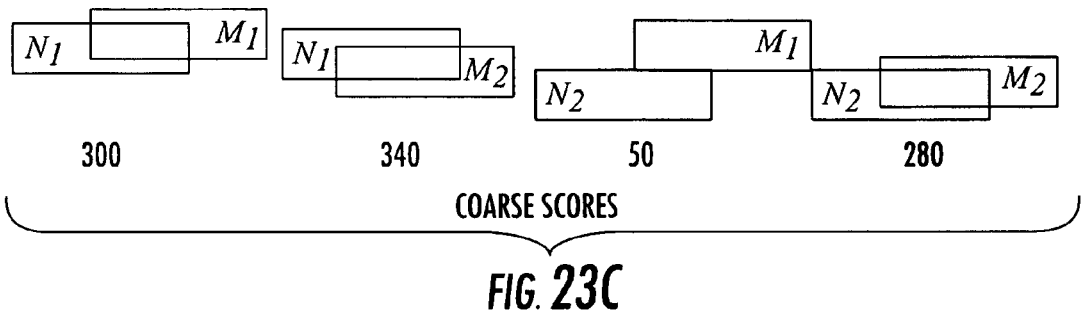
FIG. 23C
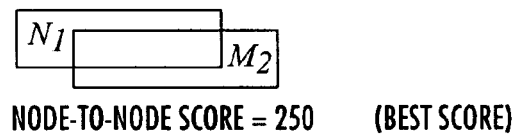
FIG. 23D
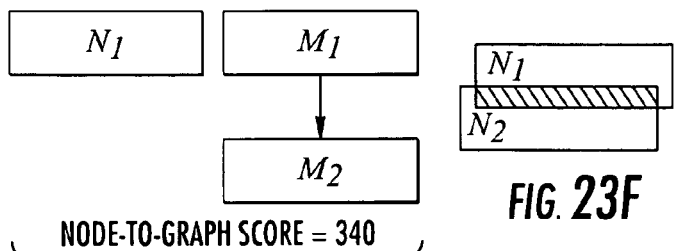
FIG. 23E
FIG. 23F
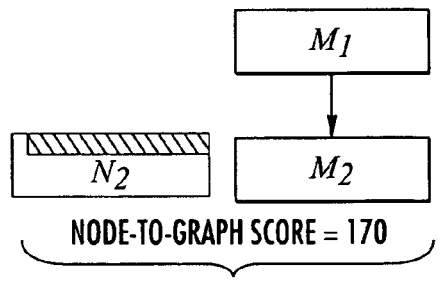
FIG. 23G

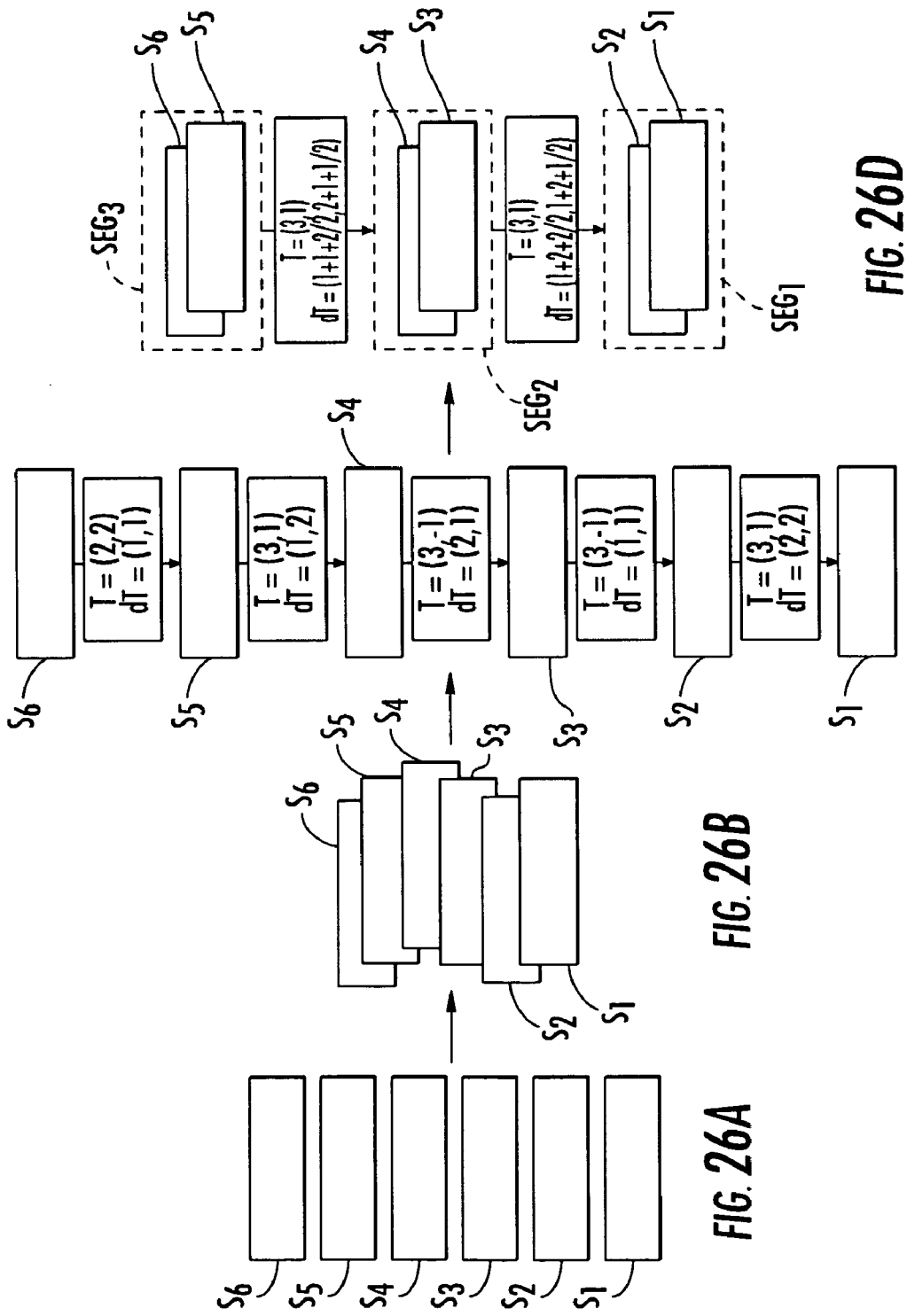

METHODS FOR FINGER BIOMETRIC PROCESSING AND ASSOCIATED FINGER BIOMETRIC SENSORS

RELATED APPLICATIONS

The present application is based upon and claims priority to U.S. Provisional Patent Application No. 60/514,059 filed Oct. 24, 2003 and U.S. Provisional Patent Application No. 60/507,793 filed Oct. 1, 2003, and the entire disclosures of each are incorporated herein by reference.

FIELD OF THE INVENTION

The present invention relates to the field of biometrics, and, more particularly, to the field of finger biometric sensing and associated enrollment and matching methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference or enrolled fingerprints already in a database to determine proper identification of a person, such as for verification purposes.

A significant advance in the area of fingerprint sensing is disclosed in U.S. Pat. No. 5,940,526 to Setlak et al. and assigned to the assignee of the present invention. The patent discloses an integrated circuit fingerprint sensor including an array of RF sensing electrodes to provide an accurate image of the fingerprint friction ridges and valleys. More particularly, the RF sensing permits imaging of live tissue just below the surface of the skin to reduce spoofing, for example. The entire contents of the Setlak et al. patent are incorporated herein by reference.

Image mosaicing is a major area of research in image processing and computer vision as noted by L. Brown in A survey of image registration techniques, *ACM Computing Surveys*, vol. 24, no. 4, pp. 325-376, 1992. It can be defined as follows. Two or more images are given with each one of them capturing only a partial view of some data of interest. The purpose of mosaicing is to generate an image providing a composite view, which is the union of the partial views. At the core of mosaicing is a process involving alignment or registration of two images. The performance of the alignment process relates to the overall performance of mosaicing. The major goal of mosaicing is the generation of composite data sets (images, or feature sets) that are as seamless as possible.

It is also possible to perform mosaicing at the feature level, instead of the image level. That is, a feature set is extracted from each input image. These sets are then combined to generate a composite feature set corresponding to their union.

There have been several research efforts on mosaicing of fingerprint data. For example, Ratha et al. in Image mosaicing for rolled fingerprint construction, *Proc. Int. Conf. Pattern Recognition*, vol. 2, pp. 1651-1653, 1998 presents a method for mosaicing of fingerprint images obtained during a finger rolling motion. Jain and Ross in Fingerprint mosaicking, *Proc. IEEE Int. Conf. on Acoustics, Speech and Signal Processing*, Orlando, Fla., 2002 disclose a technique for mosaicing of fingerprint images using minutiae for alignment. Yau et al. in On fingerprint template synthesis, *Proc. Sixth Int. Conf. on Control, Automation, Robotics and Vision*, Singapore, 2000, and U.S. Pat. No. 6,546,122 to Russo considered fingerprint mosaicing at the feature level using minutia sets.

In all of the above cases, mosaicing is performed at the physical level. In other words, the data sets (images or feature sets) are physically fused to produce a composite data set.

A fundamental limitation of physical mosaicing is that it fails to explicitly account for the uncertainty of the alignment process. Accounting for alignment uncertainty is not needed if the goal of mosaicing is, for example, subjective analysis by humans. However, it is generally of significant importance if the goal of mosaicing is to provide data to an automated process such as matching. While this applies to mosaicing in general, uncertainty accommodation is of particular importance in the context of fingerprint matching. This is because alignment of fingerprint images can be associated with considerable amounts of uncertainty. The high alignment uncertainty is due to a number of factors such as poor image quality and small overlapping area. More importantly, it is because the transformation model used for alignment is simpler than the actual one; it either does not account for local non-linear deformations, or only partially accounts for it.

Accounting for alignment uncertainty may be very difficult in the case of physical mosaicing. FIGS. 1A-1C and 2 show an example of physical mosaicing as in the prior art. The input set, which includes three images 31-33, is shown in FIGS. 1A-1C. These images 31-33 are aligned, and the alignment information is used to construct the physical mosaic image 34 in FIG. 2. The presence of slight ridge misalignment is seen in the upper central area of the mosaic. Such misalignment can be problematic to the matching process.

There has also been a recent drive in the biometrics industry to reduce the cost of biometric sensors. This drive is fueled by the need to develop cost-effective biometric solutions needed for large-scale deployment in consumer-electronic products, such as cell phones, PDAs, and notebooks. In particular, the fingerprint biometrics industry has been dropping sensor cost through reducing sensor size. Reduction of sensor size is driven not only by the desire to reduce cost, but also by the need to have sensors with a small form factor for integration into small devices, such as cell phones and PDAs.

For example, AuthenTec, Inc. of Melbourne, Fla., and the assignee of the present invention, has produced a small touch sensor whose sensing area is only 6.5 mm×6.5 mm (AES 3500). This area is less than 20% that of a typical fingerprint sensor. Further significant reduction in sensor size reduces the amount of available fingerprint information to the point where the touch mode of operation becomes very difficult, or even impossible, to support.

This shortcoming can be addressed by adopting a dynamic mode of operation, where a finger slides across the sensor, instead of just touching it. The slide operation allows the fingerprint system to gather information about a fingerprint area that is significantly larger than the physical area of the sensor. The slide sensor has a very small length along the direction of finger motion and a typical length normal to it. The touch mode of operation is a simple one, involving the downward movement of a finger until it gets in contact with the sensor surface, keeping the finger in contact with the sensor for a reasonable amount of time until the sensor acquires an image of the fingerprint, and upward movement of the finger away from the sensor.

The slide mode of operation is a slightly more complicated one. It involves downward movement of the finger until a lower part of it gets in contact with the slide sensor, sliding the finger across the sensor for a reasonable distance, or until contact is lost, and upward movement of the finger away from the sensor.

Processing of fingerprint data provided by a slide sensor poses significant algorithmic challenges. The slide data are provided as a sequence of images, referred to as image slices, or simply slices. The dimensions of each slice are the same as that of the sensor. The sequence of slices corresponds to successive areas of the fingerprint. For recognition purposes, it may be highly desirable that consecutive slices represent overlapping areas of the fingerprint. Slice overlapping permits aligning consecutive slices, and subsequently obtaining information about the big fingerprint picture from the given slices.

FIG. 3B shows a sequence of slices, $S=\{s_1, \ldots, s_n\}$ mapped to a fingerprint as in the prior art, along with the speed profile 35 of the sliding finger 36 (finger speed as a function of time of FIG. 3A). The extent of overlap between consecutive slices is inversely proportional to the speed of the finger. Thus, the overlap information can be used to estimate the speed profile. To maintain overlap, the slide speed of the finger 36 should not exceed a certain limit, which is proportional to the scanning rate of the sensor. If the speed does exceed the limit within a certain time interval, then consecutive slices obtained within this interval will have gaps between them. This scenario is depicted in FIGS. 4A and 4B. Slices obtained within the over-speeding time interval cannot be accurately aligned with other slices. The only possibility is obtaining crude alignment by performing interpolation of the speed profile.

The mapping between a slice and its location on the fingerprint is not necessarily a simple one. FIGS. 3B and 4B implicitly assume that each slice is captured "instantaneously". Accordingly, the rectangular slice obtained by the slide sensor maps to an identical rectangular area on the fingerprint. The assumption of an instantaneous snapshot is reasonable, only if the sensor scanning rate is significantly high relative to the slide speed. Otherwise, the slice-to-fingerprint mapping will become a more involved one. For example, assume that the slice is captured column by column, where each column is captured almost instantaneously. In such a case, the rectangular slice maps to a parallelogram, where the extent of deviation from a rectangle is proportional to the slide speed. This is demonstrated in FIGS. 5A and 5B. On the other hand, consider the case where the scanning is performed in a row wise fashion, such that the scan of each row is done almost instantaneously. In such a case, the slice rectangle maps to another rectangle that is stretched along the direction of motion, where the extent of stretching is proportional to the slide speed (see FIGS. 6A and 6B). Prime and multiple prime notation is used to indicate similar elements in FIGS. 4A through 6B.

The majority of fingerprint recognition systems rely on touch sensors. It is only recently that slide sensors have been used for fingerprint recognition. Note that slide sensors are also commonly known as swipe or sweep sensors. A key component of any slide-sensor system is preprocessing of the slide data, represented as a sequence of slices, before using it for matching. Virtually, all existing systems attempt to reconstruct a fingerprint image from the sequence of slices generated by the slide sensor.

For example, U.S. Pat. Nos. 6,289,114 and 6,459,804 to Mainguet describe a method for image reconstruction from slices obtained using a thermal slide sensor. In this work, image slices are stitched together to form a fingerprint image. Stitching is based on alignment of consecutive slices using correlation. Published U.S. application U.S. 2003-0123714 A1 to O'Gorman et al. discloses another approach for image reconstruction. Some highlights of this work can be outlined as follows. The sequence of images provided by the slide sensor is processed to generate an image of the fingerprint. However, only a subset of the image, which they define as a slice, is used in the reconstruction. This sub-image has the same number of columns as the original image but fewer rows. Correlation is based on a sub-image of the slice, which is referred to as a frame. This sub-image has the same number of columns as the sensor but fewer rows than the slice. A frame in a slice is correlated with similar frames in an adjacent slice to determine the extent of overlap between them.

Apparent stretching of image slices due to slide speed is accounted for through removing some image rows. Some characteristics of the slide process can be used to differentiate between a real finger and a fake one (e.g., average speed).

Published U.S. patent application No. 2003-0126448 A1 to Russo discloses a method for reconstructing an image from image slices, based on normalized cross correlation. Statistics of the acquisition process such as angle of slide direction and slide speed can be embedded in the image.

Published U.S. patent application No. 2002-0067845 A1 to Griffis describes a method for image reconstruction using a line sensor. The sensor is augmented with few sensing elements normal to the sensing line. These auxiliary elements are used to estimate finger speed, which is needed for image reconstruction from the acquired sequence of one-line slices. Finally, Maltoni et al. in Handbook of fingerprint recognition, Springer-Verlag, New York, 2003 propose an image reconstruction method from slide data. The method is based on first calculating the horizontal and vertical shifts between consecutive slices. The profiles of these shifts are smoothed and then subsequently used for image reconstruction.

The approaches described above process the slide data to construct a fingerprint image. Representing slide data using an image is fundamentally limited in its ability to accommodate the uncertainties involved in the image reconstruction process. These uncertainties mainly correspond to errors in the alignment of consecutive slices. For example, assume that the relative transformation between two consecutive slices is described by vertical and horizontal translations. If the resolution of the alignment is at the pixel level, then there is a fundamental error of plus or minus half a pixel both vertically and horizontally. Alignment uncertainty depends not only on image quantization, but also on a number of other factors. These factors include:

1. Image Noise: Alignment uncertainty is proportional to the amount of image noise.

2. Transformation Model Error: This refers to the difference between the assumed transformation model used for alignment and the actual one. The closer the assumed model to the actual one, the less the alignment uncertainty is. The price is paid in more complex and time-consuming alignment. For example, a transformation model that accounts for only two-dimensional translation is expected to have more alignment uncertainty than that which includes rotation as well as two-dimensional translation. The latter transformation model is expected to have more uncertainty than one that further accounts for local non-linear distortions.

3. Alignment Algorithm: This includes the criterion used to determine the alignment (e.g., sum of squared differences, normalized cross correlation, see L. Brown, A survey of image registration techniques, *ACM Computing Surveys*, vol. 24, no. 4, pp. 325-376, 1992.) Some criteria produce more accurate alignments than others. The algorithm also includes the strategy used to search the transformation space (e.g., coarse-to-fine searching versus flat searching).

4. Slide Speed: As mentioned earlier, the amount of overlap between consecutive slices depends on slide speed. Intuitively, the amount of information available for alignment is proportional to the amount of overlap. Thus, fundamentally, alignment uncertainty is proportional to slide speed. In the extreme case, the slide speed exceeds the limit for having overlap between consecutive slices (see FIGS. 4A and 4B). In such a case, alignment can only be determined coarsely through interpolation of the speed profile, which can significantly increase the uncertainty.

5. Image Content: Uniform fingerprint image areas, e.g., those composed of parallel ridges, can increase the amount of alignment uncertainty, whereas unique areas can reduce it. In general, alignment uncertainty is inversely proportional to image information content.

Another level of complication arises since the alignment is based on comparing consecutive, or very close, slices. Thus, alignment error accumulates as the image gets constructed. For example, let $S=\{s_1, \ldots s_n\}$ be a sequence of slices, and $U(s_i, s_j)$ a measure of the alignment uncertainty between slices $s_i$ and $s_j$. Intuitively, $U(s_1, s_3)$ is the accumulation of uncertainties $U(s_1, s_2)$ and $U(s_2, s_3)$. Similarly, $U(s_1, s_4)$ is the accumulation of $U(s_1, s_2)$, $U(s_2, s_3)$ and $U(s_3, s_4)$ and so on. The uncertainty reaches its maximum level between $s_1$ and $s_n$, $U(s_1, s_n)$. From the above discussion, it can be seen that ignoring the uncertainty in the alignment among image slices can lead to significant degradation in performance of fingerprint recognition.

SUMMARY OF THE INVENTION

In view of the foregoing background it is therefore an object of the present invention to provide a method for finger biometric processing and associated sensor that is accurate and readily implemented.

This and other objects, features and advantages in accordance with the present invention are provided by a method for processing a plurality of finger biometric enrollment data sets that accounts for uncertainty in alignment between the finger biometric enrollment data sets. More particularly, the method may include generating a respective estimated physical transformation between at least one pair of finger biometric enrollment data sets, and generating a respective uncertainty for each estimated physical transformation. The method may also include associating the respective estimated physical transformation and the uncertainty with the at least one pair of finger biometric enrollment data sets to define a logical finger biometric enrollment graph. The logical finger biometric enrollment graph is readily used for subsequent accurate matching.

The method may also include generating a respective confidence score for an alignment between the at least one pair of finger biometric enrollment data sets. Accordingly, associating may further comprise associating the respective confidence score with the at least one pair of finger biometric enrollment data sets to further define the logical finger biometric enrollment graph.

In one class of embodiments, the plurality of finger biometric enrollment data sets may be generated based upon successive placements of a user's finger upon a finger biometric touch sensor. The method may also include generating at least one finger biometric verify data set, and comparing the at least one finger biometric verify data set with the logical finger biometric enrollment graph to determine a match therewith. The comparing may comprise determining which finger biometric enrollment data set produces a highest match value with the at least one finger biometric verify data set thereby defining an anchor node of the logical finger biometric enrollment graph. The comparing may also include determining a match score between the at least one finger biometric verify data set and at least one other finger biometric enrollment data set. The method may also further comprise removing redundant data of the anchor node from the at least one other finger biometric enrollment data set.

In another class of embodiments, the finger biometric enrollment data sets may be generated based upon sliding placement of a user's finger upon a finger biometric slide sensor that generates a series of finger biometric enrollment data sets during sliding. In these embodiments, the method may also include generating a series of finger biometric verify data sets using the finger biometric slide sensor, and generating a respective estimated physical transformation between at least one pair of finger biometric verify data sets. The method may also include generating a respective uncertainty for each estimated physical transformation, and associating the respective estimated physical transformation and the uncertainty with each pair of finger biometric verify data sets to define a logical finger biometric verify graph. In other words, a logical finger biometric verify graph may also be generated for slide finger sensor matching.

Generating the respective uncertainty may comprise using at least one of a uniform and Gaussian probability distribution function, for example. The method may also include generating an initial alignment between the logical finger biometric enrollment graph and the logical finger biometric verify graph. Accordingly, the logical finger biometric verify graph may be compared with the logical finger biometric enrollment graph based upon the initial alignment to determine a match therewith. Redundant data may be removed from at least one of the logical finger biometric enrollment graph and logical finger biometric verify graph.

Comparing the logical finger biometric verify graph with the logical finger biometric enrollment graph may comprise generating an uncertainty in alignment between at least one node in the logical finger biometric verify graph and at least one node in the logical finger biometric enrollment graph. The comparing may also include performing constrained node-to-graph matching based upon the uncertainty in alignment between at least one node in the logical finger biometric verify graph and at least one node in the logical finger biometric enrollment graph, and generating an overall graph matching score based upon the constrained node-to-graph matching.

The estimated physical transformations may be generated based upon correlating respective sub-regions in the at least one pair of finger biometric enrollment data sets. Each finger biometric enrollment data set may comprise a finger biometric enrollment image data set. Accordingly, the method may also include subjecting each finger biometric enrollment image data set to at least one of image enhancement for reducing noise content, and image warping to account or non-instantaneous sensor operation or non-linear deformations.

Each estimated physical transformation may comprise at least one of a horizontal translation, a vertical translation, and a rotation. Each finger biometric enrollment data set may comprise at least one of a finger image data set and a finger biometric feature set, for example. In some embodiments, each finger biometric enrollment data set may itself comprise a combination of finger biometric enrollment data subsets. In other words, the data sets may be considered as segments, each segment including a combination of finger biometric enrollment data subsets.

Each estimated physical transformation may be based upon alignment of respective edges in the pair of finger biometric enrollment data sets, for example. The finger biometric enrollment data sets may be generated by an integrated circuit finger biometric sensor, such as an electric field fingerprint sensor.

Another aspect of the invention relates to a related finger biometric sensor. The finger biometric sensor may include a finger biometric sensing area, and a processor connected to the finger biometric sensing area. The processor may generate a plurality of finger biometric enrollment data sets in cooperation with the finger biometric sensing area, generate a respective estimated physical transformation between at least one pair of finger biometric enrollment data sets, and generate a respective uncertainty for each estimated physical transformation. The processor may also associate the respective estimated physical transformation and the uncertainty with the at least one pair of finger biometric enrollment data sets to define a logical finger biometric enrollment graph. The finger biometric sensor may be a touch sensor, or a slide sensor, for example.

Another aspect of the invention also relates to a finger biometric sensor comprising a finger biometric sensing area, and a memory storing a logical finger biometric enrollment graph. The logical enrollment graph may be based upon a plurality of finger biometric enrollment data sets, a respective estimated physical transformation between at least one pair of finger biometric enrollment data sets, and a respective uncertainty for each estimated physical transformation. The finger biometric sensor may also include a processor for generating at least one finger biometric verify data set in cooperation with the finger biometric sensing area, and comparing the at least one finger biometric verify data set with the logical finger biometric enrollment graph to determine a match therewith.

BRIEF DESCRIPTION OF THE DRAWINGS

FIGS. 10-13C are schematic diagrams of the logical finger biometric enrollment graph and a finger biometric verify data set illustrating matching thereof in accordance with the present invention.

FIGS. 22A-22E are schematic diagram representations for node-to-edge matching as may be used by the slide sensor of FIG. 15.

FIGS. 23A-23G are schematic diagram representations for graph-to-graph matching as may be used by the slide sensor of FIG. 15.

FIGS. 26A-26D are a sequence of schematic diagram representations illustrating stages of construction of a segment graph as may by used by the slide sensor of FIG. 15.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention relates to the use of uncertainty of the physical transformations between different finger biometric enrollment data sets. For clarity of explanation this and related features and advantages will first be explained with respect to their use in a touch finger biometric sensor, and thereafter these concepts are also applied with additional features and advantages to a slide finger biometric sensor.

Figure 7:
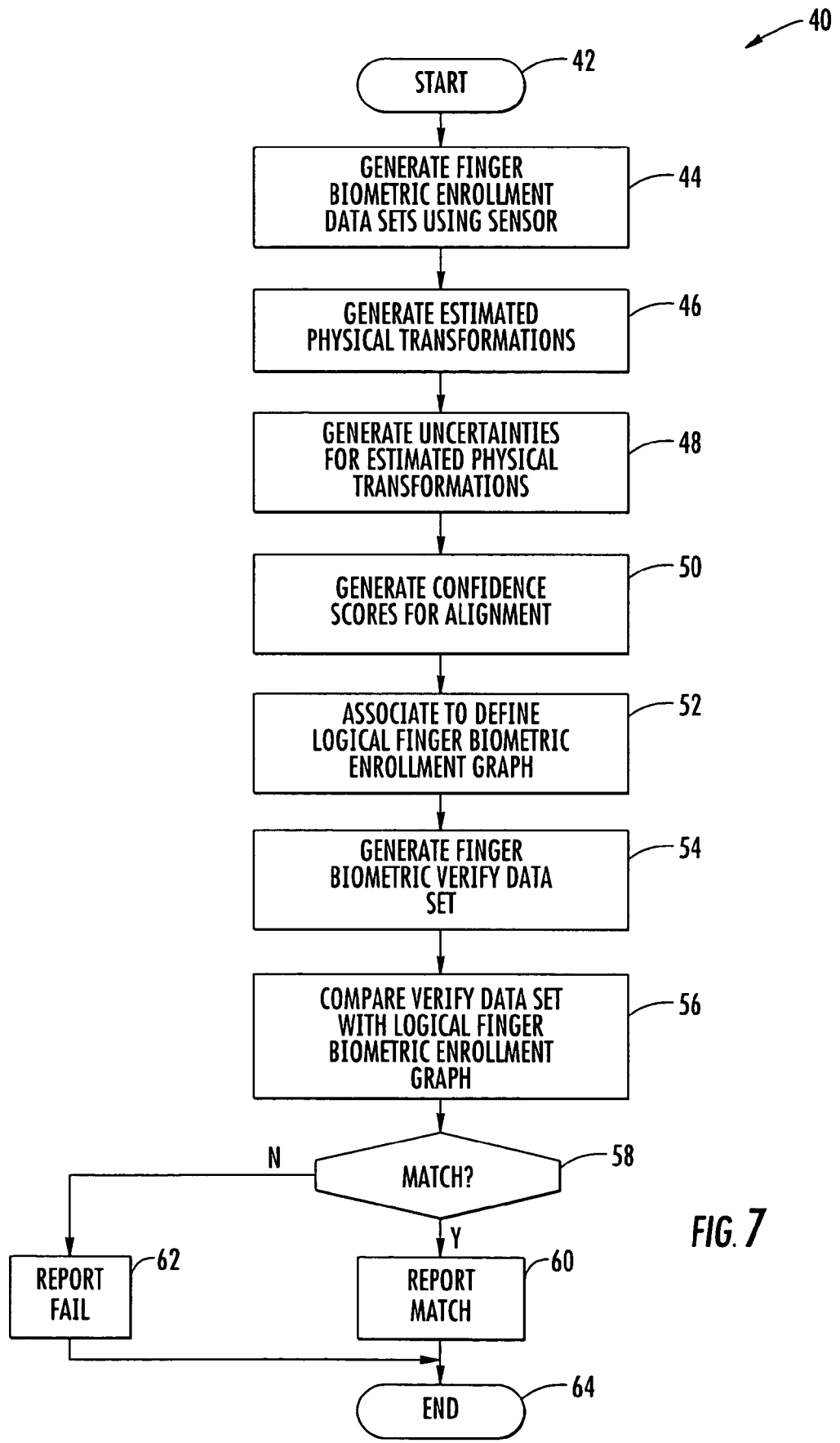
FIG. 7 is a flowchart for a method embodiment of the present invention.

Referring initially to the flowchart 40 of FIG. 7, some of the basic method steps for mosaic image processing using a touch sensor, for example, are now described. From the start (Block 42), the method may include generating finger biometric enrollment data sets at Block 44. The finger biometric enrollment data sets may comprise one or both of fingerprint image, or finger biometric feature data sets.

At Block 46 estimated physical transformations are generated as will be described in greater detail below. At Block 48 uncertainties are generated for the estimated physical transformations, as will also be described in greater detail below. Confidence scores for alignment may also be optionally generated at Block 50. At Block 52, the respective estimated physical transformations, uncertainties, and confidence scores are associated to define a logical finger biometric enrollment graph.

At least one finger biometric verify data set is generated (Block 54) and this is compared to the logical finger biometric enrollment graph at Block 56. In other words, the sensor collects an image data set and/or a feature data set from current placement of a user's finger to verify whether the user matches an enrolled user. If a match is determined at Block 58, then a match report is generated at Block 60 before ending (Block 64). If a match is not determined, then a match fail report is generated at Block 62.

As will be explained in greater detail below, the comparing at Block 56 may comprise determining which finger biometric enrollment data set produces a highest match value with the at least one finger biometric verify data set thereby defining an anchor node of the logical finger biometric enrollment graph, and determining a match score between the at least one finger biometric verify data set and at least one other finger biometric enrollment data set. Comparing at Block 56 may also further comprise removing redundant data of the anchor node from the at least one other finger biometric enrollment data set prior to determining the match score.

The basic finger biometric sensor 70 for performing the method outlined with reference to the flowchart 40 of FIG. 7 is now described. The finger biometric sensor 70 illustratively includes a finger biometric sensing area 73 that is part of an integrated circuit fingerprint sensor 72, for example. The integrated circuit fingerprint sensor 72 may of the RF or electric field sensing type as described in the above noted U.S. Pat. No. 5,940,526 to Setlak et al. Of course, other finger biometric sensors may also be used as will be appreciated by those skilled in the art.

The finger biometric sensor 70 also illustratively includes a finger biometric controller 80 that may reside as separate circuitry or may be included on the integrated circuit substrate that also supports the finger biometric sensing area 73. The controller 80 includes a processor 81 connected to the finger biometric sensing area 73.

The processor 81 may generate a plurality of finger biometric enrollment data sets in cooperation with the finger biometric sensing area 73, generate a respective estimated physical transformation between each pair of finger biometric enrollment data sets, and generate a respective uncertainty for each estimated physical transformation. The processor 81 may also associate the respective estimated physical transformation and the uncertainty for each estimated physical transformation with each pair of finger biometric enrollment data sets to define the logical finger biometric enrollment graph. This logical finger biometric enrollment graph may be stored in the illustrated memory 82.

The processor 81 may also perform the comparing between the logical finger biometric enrollment graph and at least one finger biometric verify data set as will be appreciated by those skilled in the art. The output from the processor 81 may be a "match" or a "match fail" output. The processor 81 may comprise a microprocessor operating under stored program control.

Figures 1A, 1B, 1C:
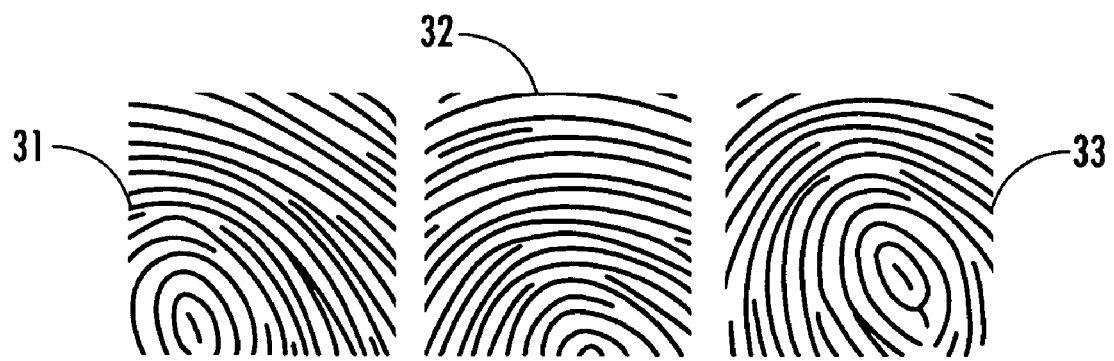
FIGS. 1A-1C are example fingerprint images in accordance with the prior art.
Figure 2:
FIG. 2 is a physical mosaic image of the three example fingerprint images as shown in FIGS. 1A-1C in accordance with the prior art.
Figure 3A:
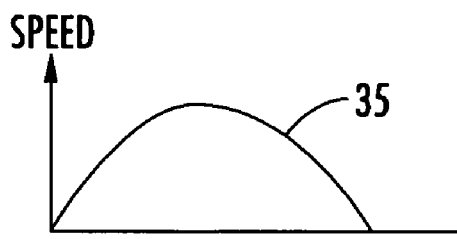
FIG. 3A is a schematic plot of finger speed versus displacement over a slide fingerprint sensor of the prior art.
Figure 3B:
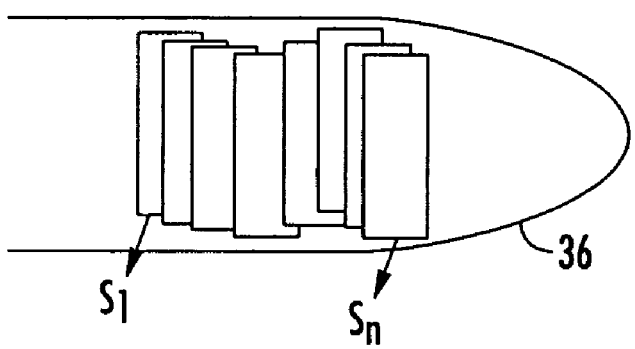
FIG. 3B is a schematic plan view mapping the image slices from the slide fingerprint sensor and following the plot of FIG. 3A as in the prior art.
Figure 4A:
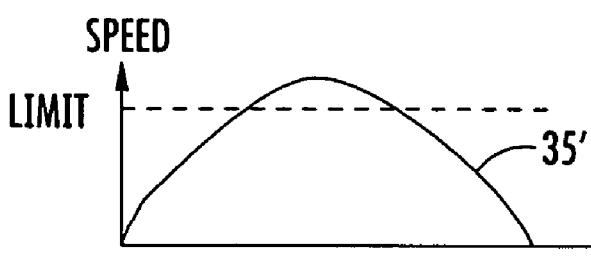
FIG. 4A is a graph of finger speed versus displacement over a slide fingerprint sensor of the prior art.
Figure 4B:
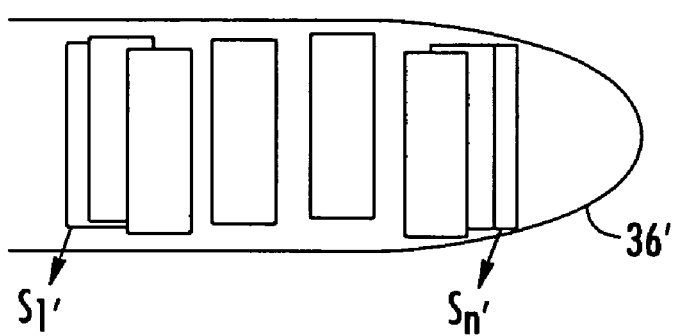
FIG. 4B is a schematic plan view mapping the image slices from the slide fingerprint sensor and following the plot of FIG. 4A as in the prior art.
Figure 5A:
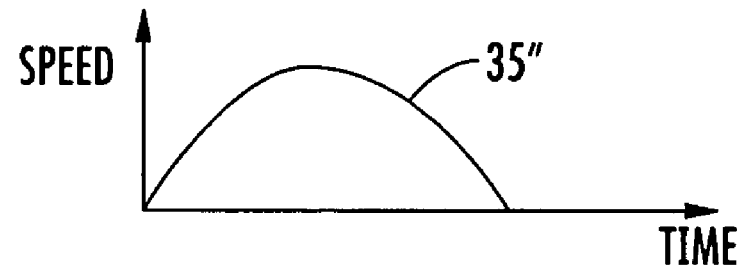
FIG. 5A is a graph of finger speed versus displacement over a slide fingerprint sensor of the prior art.
Figure 5B:
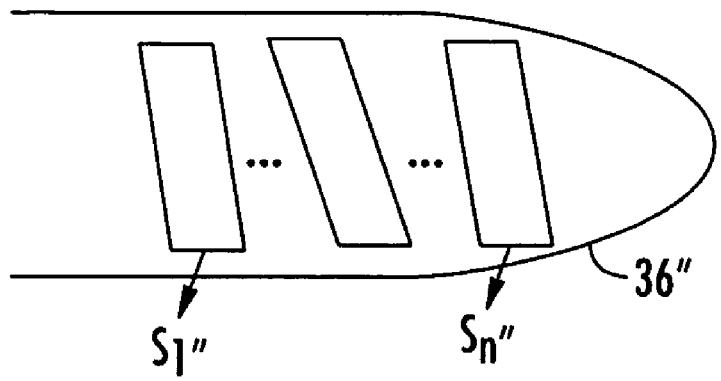
FIG. 5B is a schematic plan view mapping the image slices from the slide fingerprint sensor and following the plot of FIG. 5A as in the prior art.
Figure 6A:
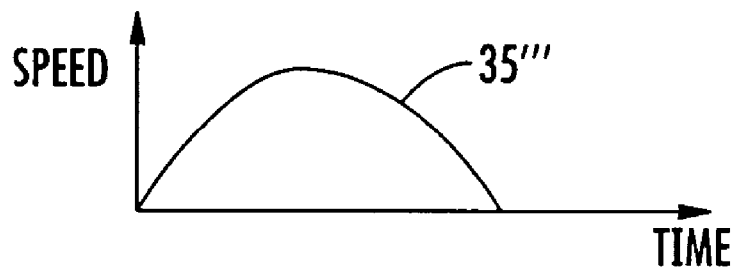
FIG. 6A is a graph of finger speed versus displacement over a slide fingerprint sensor of the prior art.
Figure 6B:
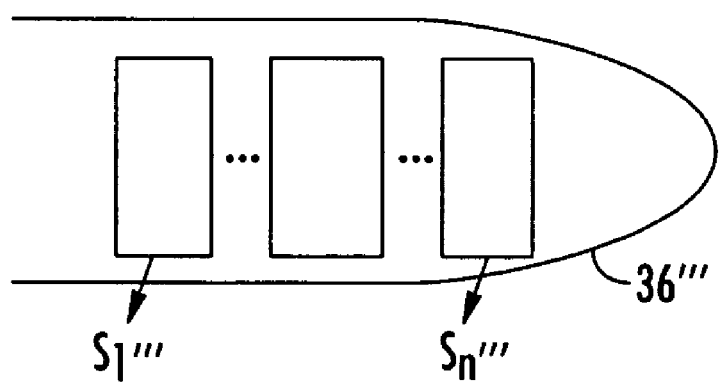
FIG. 6B is a schematic plan view mapping the image slices from the slide fingerprint sensor and following the plot of FIG. 6A as in the prior art.

To overcome the difficulty in the prior art as described with respect to FIGS. 1A-2, mosaicing is performed logically in accordance with this aspect of the invention. That is, instead of physically stitching given data sets (images or feature sets), they are stored separately along with the alignment information among them. The alignment information between two data sets includes both the estimated transformation and the uncertainty in the transformation.

Figure 9:
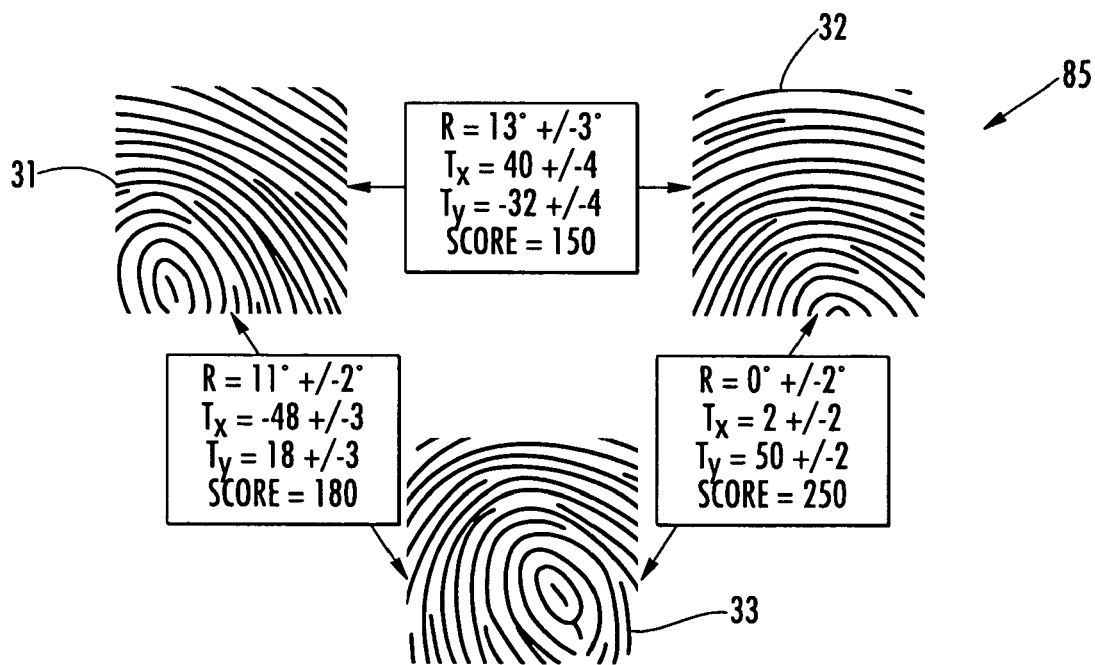
FIG. 9 is a logical finger biometric enrollment graph as generated in the method illustrated in FIG. 7 and used by the finger biometric sensor of FIG. 8.

FIG. 9 shows the logical mosaic image in the form of the logical finger biometric enrollment graph 85 based upon the input fingerprint images 31-33 from FIGS. 1A-1C. As can be seen, it is represented by the graph structure 85, referred to as mosaic graph. In this graph, nodes represent input images, or feature sets extracted from them, and edges represent the uncertain alignment information between incident nodes. This information is represented by:

1. Transformation: rotation, R, horizontal translation, $T_x$, and vertical translation, $T_y$.
2. Transformation Uncertainty: The uncertainty associated with the transformation parameters.
3. Score: This score represents confidence in the alignment. In FIG. 9, notice how the amount of uncertainty is inversely proportional to the score.

In addition to uncertainty accommodation, logical mosaicing has another important advantage over physical mosaicing. Representing a composite template using a mosaic graph significantly simplifies dynamic template update, during either the enrollment or matching stages. For example, deleting the sub-mosaic contributed by one of the input images can be achieved by simply deleting corresponding node along with edges incident to it. Insertion of a new sub-mosaic is achieved by simply adding a new node along with edges describing alignment information with existing nodes. Updating the mosaic graph can be based on criteria such as overall fingerprint area covered by the graph, image quality, connectivity with other nodes, etc.

Matching a fingerprint image against a mosaic graph can be further described as follows. The matcher first attempts to find a reliable alignment between the verification image and one of the nodes in the mosaic graph. This node is referred to as the anchor node. Matching is recursively propagated from the anchor node to other ones, as guided by the alignment information in the edges. The matcher accounts for uncertainty by examining the transformation subspaces defined by the edges, instead of examining the estimated transformations only.

Before matching propagates from a mosaic node to another, features in the verification image that lie in the overlapping area with the given node are deleted. This is to prevent these features from being matched more than once. Each match between the verification image and a mosaic node generates a score. These scores are then combined to generate an overall score corresponding to the match between the verification image and the mosaic graph. Details of the combination process are dependent upon the matcher used.

Figure 10:
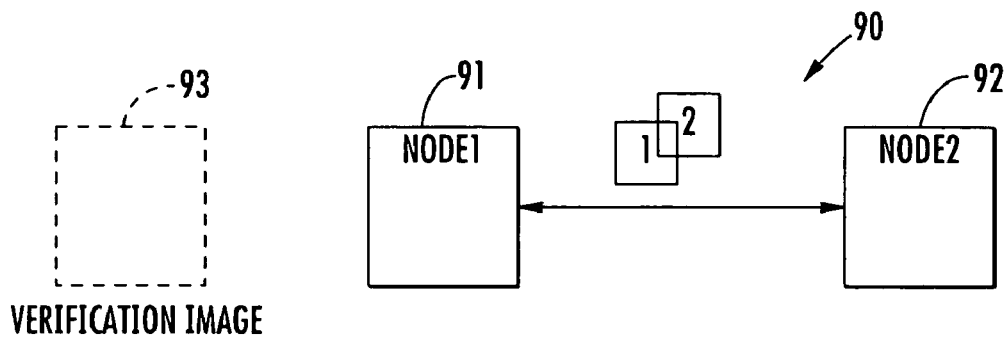
Figure 11:
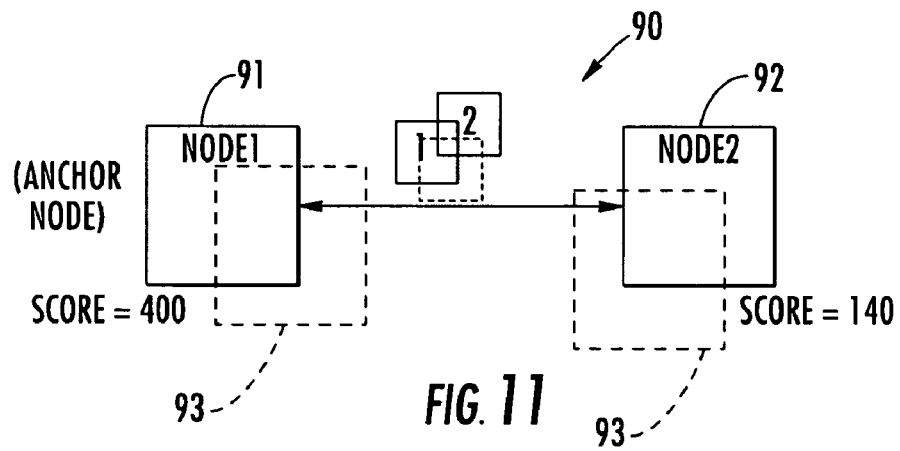

A simple example of the matching process is explained with additional reference to FIG. 10. As seen in FIG. 10, the mosaic graph 90 (logical finger biometric enrollment graph) includes two nodes 91, 92 to be matched with a verification image 93. The first step is to search for an anchor node. This is done by matching the verification image against the first node 91 and the second node 92 to generate scores 400 and 140, respectively, as understood with reference to FIG. 11. The alignment with the first node 91 is determined to be more reliable than that with the second node 92, since it is generating a higher score. Accordingly, the first node 91 is selected as an anchor node.

Figure 12:
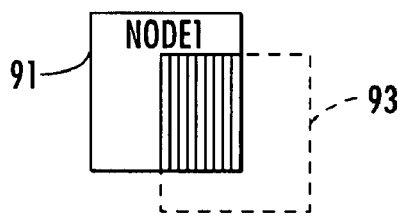
Figures 13A, 13B, 13C:
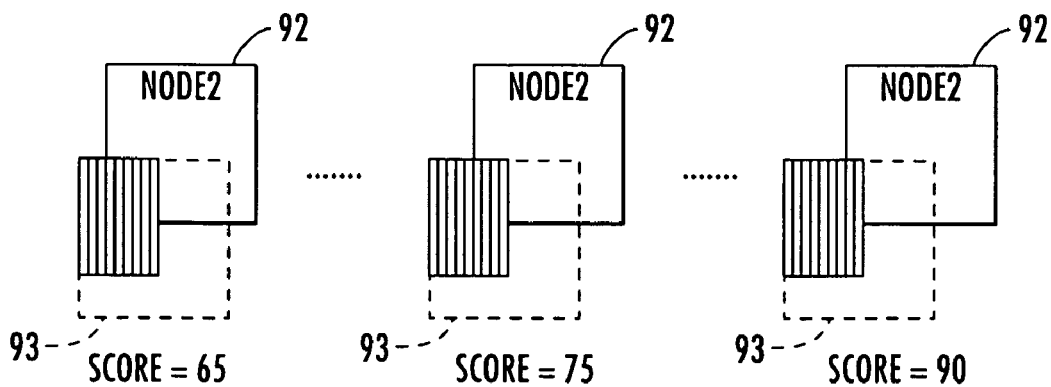

The next step is to delete features in the verification image 93 that lie in the overlapping area with the anchor node 91 as shown in FIG. 12. Matching then proceeds to the second node 92 as guided by the uncertain alignment information in the mosaic edge joining the first and second nodes 91, 92. In particular, the "truncated" verification image 93 is matched with the second node 92 at the alignments that lie within the uncertainty bounds defined in the mosaic edge. The match score is selected as the highest one obtained. This process is shown sequentially in FIGS. 13A-13C, where the highest score is 90 (FIG. 13C). The overall matching score is a function of the individual scores, which are 400 and 90, in this example. As mentioned earlier, the score-combination function depends on the matcher. For example, it could simply be the sum of 400 and 90, and so the overall score, in this case, would be 490.

Figure 14:
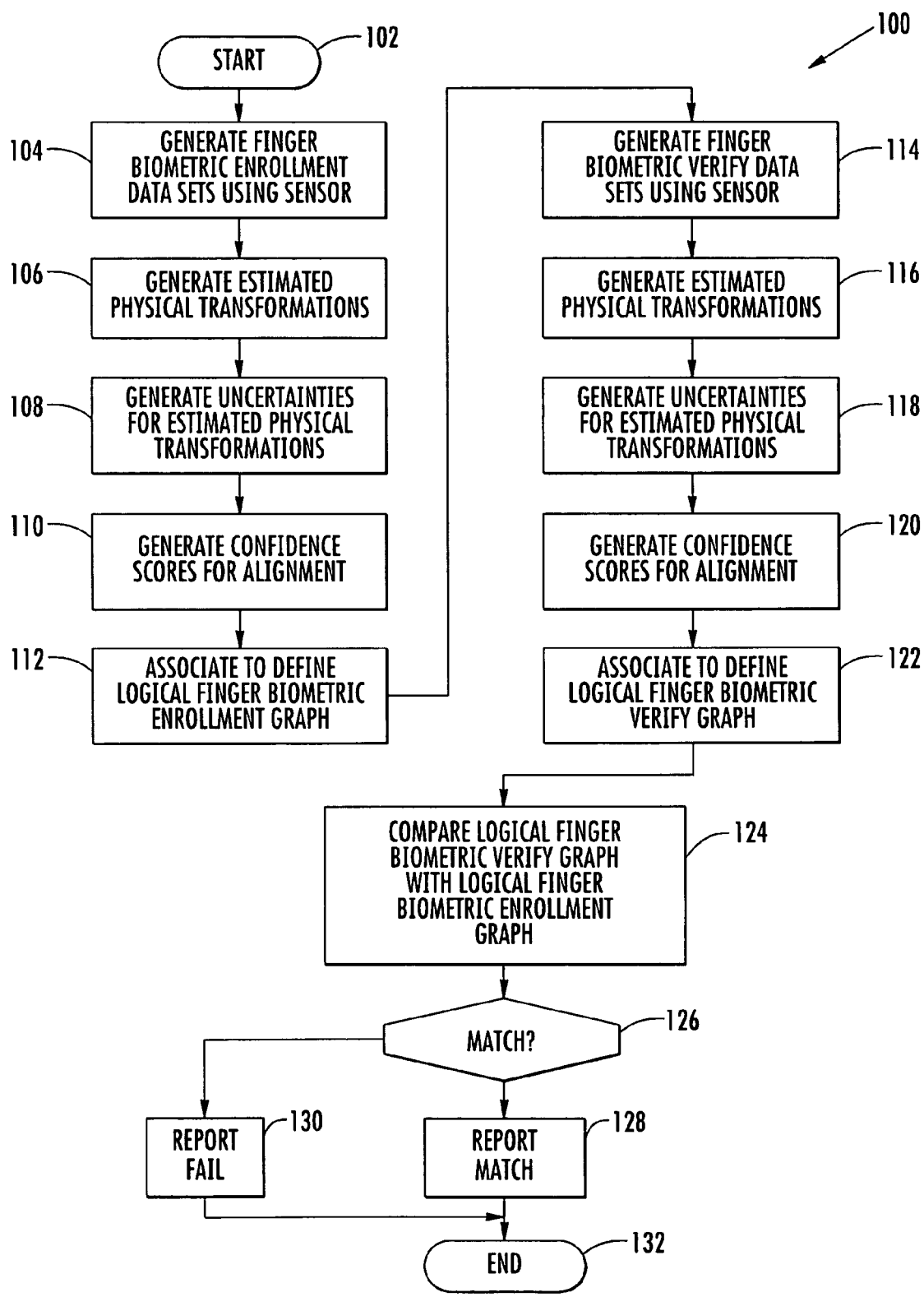
FIG. 14 is a flowchart for another method embodiment of the present invention.
Figure 15:
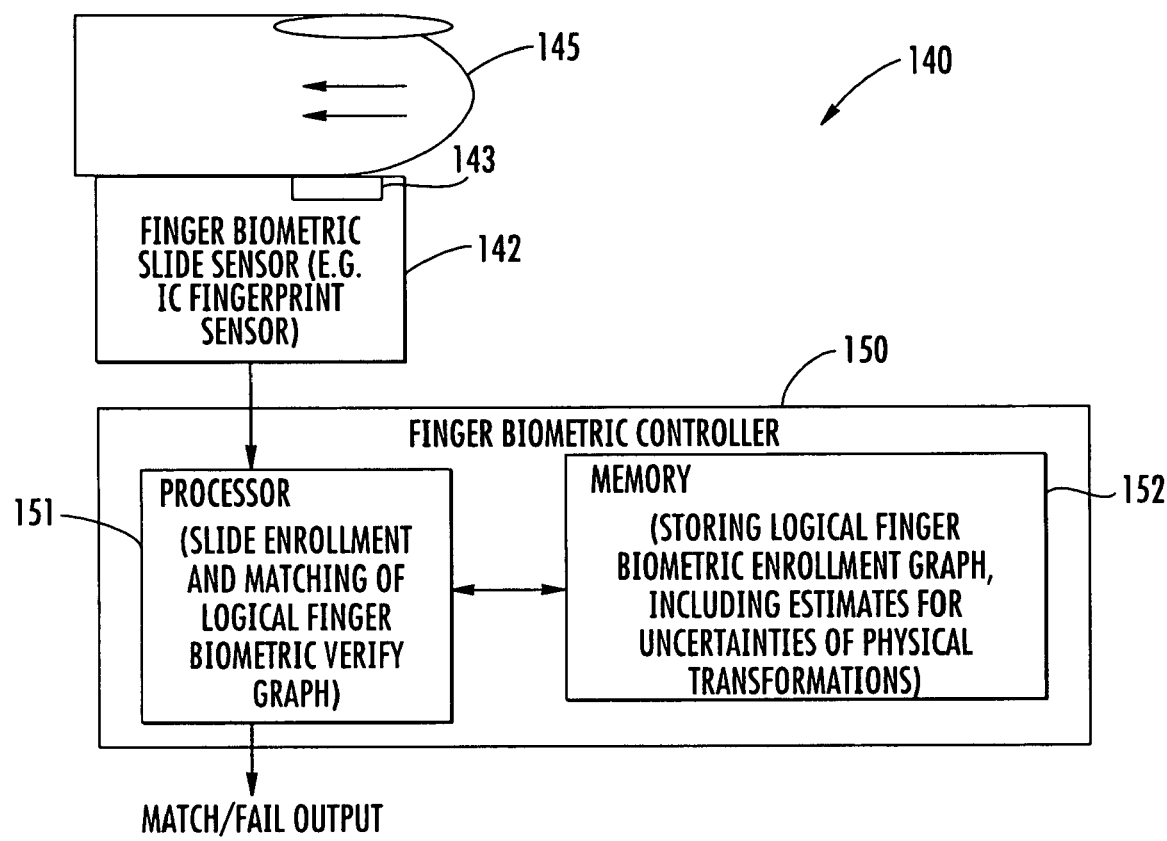
FIG. 15 is a schematic block diagram of a finger biometric slide sensor for carrying out the method shown in FIG. 14.

Referring now to FIGS. 14 and 15, aspects of the invention as relating to a slide finger biometric sensor are now described. From the start (Block 102), the method may include generating finger biometric enrollment data sets at Block 104. The finger biometric enrollment data sets may comprise one or both of slices of a fingerprint image, or finger biometric feature data sets from the slices.

At Block 106 estimated physical transformations are generated as will be described in greater detail below. At Block 108 uncertainties are generated for the estimated physical transformations, as will also be described in greater detail below. Confidence scores for alignment may also be optionally generated at Block 110. At Block 112, the respective estimated physical transformations, uncertainties, and confidence scores are associated to define a logical finger biometric enrollment graph.

Blocks 114-122 set forth the steps to generate a logical finger biometric verify graph. More particularly, the method includes generating finger biometric verify data sets at Block 114. In other words, the slide sensor collects slices from current sliding placement of a user's finger to verify whether the user matches an enrolled user.

At Block 116 estimated physical transformations are generated. At Block 118 uncertainties are generated for the estimated physical transformations. Confidence scores for alignment may also be optionally generated at Block 120. At Block 122, the respective estimated physical transformations, uncertainties, and confidence scores are associated to define a logical finger biometric verify graph.

The logical finger biometric verify graph is compared to the logical finger biometric enrollment graph at Block 124. If a match is determined at Block 126, then a match report is generated at Block 128 before ending (Block 132). If a match is not determined, then a match fail report is generated at Block 130.

Figure 8:
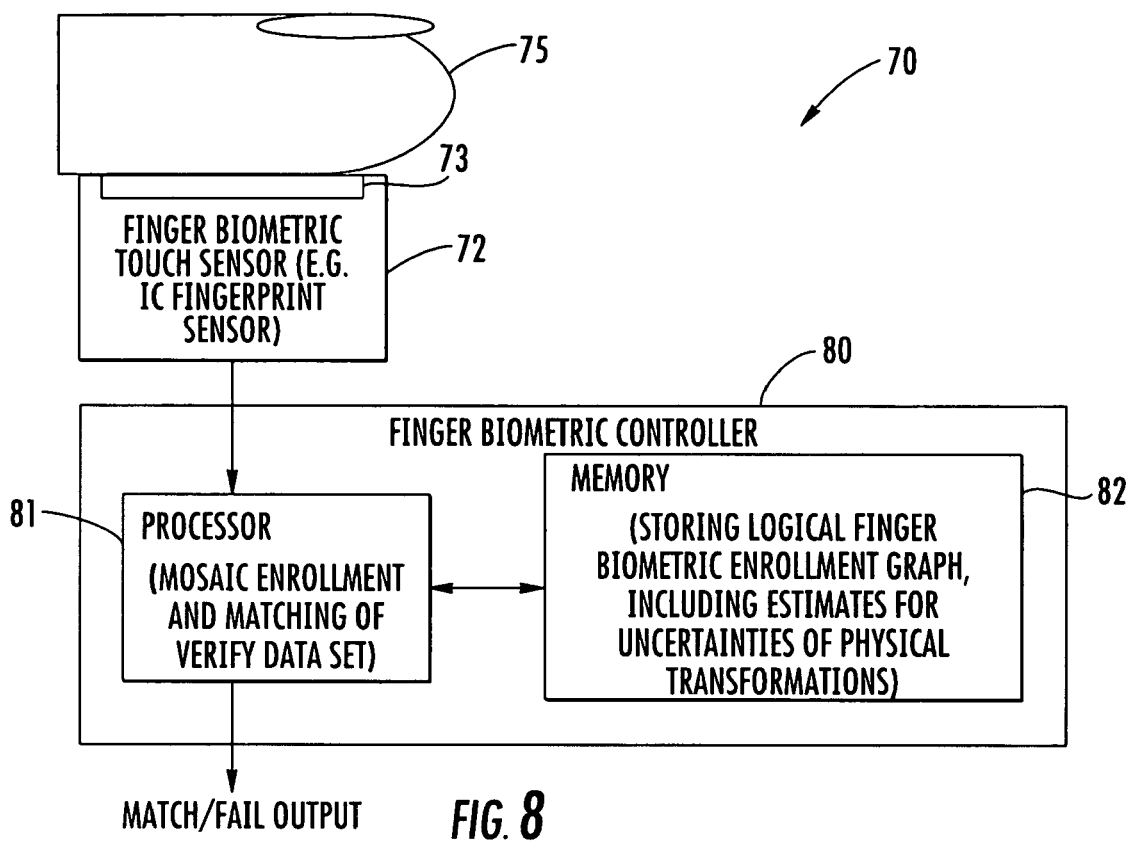
FIG. 8 is a schematic block diagram of a finger biometric touch sensor for carrying out the method shown in FIG. 7.

The basic finger biometric slide sensor 140 for performing the method outlined with reference to the flowchart 100 of FIG. 14 is now described. The finger biometric sensor 140 illustratively includes a finger biometric sensing area 143 that is part of an integrated circuit fingerprint sensor 142, for example. The integrated circuit fingerprint sensor may of the RF or electric field slide sensing type having a relatively smaller sensing area 143 than the sensing area 73 of the sensor 70 described above with reference to FIG. 8. Of course, other finger biometric slide sensors may also be used as will be appreciated by those skilled in the art.

The finger biometric sensor 140 also illustratively includes a finger biometric controller 150 that may reside as separate circuitry or may be included on the integrated circuit substrate that also supports the finger biometric sensing area 143. The controller 150 includes a processor 151 connected to the finger biometric sensing area 143.

The processor 151 may generate a plurality of finger biometric enrollment data sets in cooperation with the finger biometric sensing area 153, generate a respective estimated physical transformation between each pair of finger biometric enrollment data sets, and generate a respective uncertainty for each estimated physical transformation. The processor 151 may also associate the respective estimated physical transformation and the uncertainty for each estimated physical transformation with each pair of finger biometric enrollment data sets to define the logical finger biometric enrollment graph. This logical finger biometric enrollment graph may be stored in the illustrated memory 152.

The processor 151 may also generate the logical finger biometric verify graph in a similar fashion and perform the comparing between the logical finger biometric enrollment graph and logical finger biometric verify graph. The output from the processor 151 may be a match or match fail output. The processor 151 may comprise a microprocessor operating under stored program control.

A number of the steps described generally above are now described in greater detail. In particular, the uncertainty-accommodating representation of slide data is now described. Rigid representation of slide data, using an image, results in loss of information regarding alignment uncertainty. To overcome this limitation, image-based representation of the slide data is replaced by a graph-based representation, referred to as the slice graph or the logical finger biometric enrollment graph. The slice graph is an attributed directed graph including nodes and edges similar to the mosaic graph described above. Nodes in the slice graph represent individual image slices, while edges represent alignment information between the slices, for example. In particular, a directed edge from node $N_i$ to node $N_j$ indicates that the slice associated with $N_i$ precedes that associated with $N_j$ in the raw sequence of slices. This edge is labeled by the transformation of $N_j$ relative to $N_i$, and the uncertainty associated with that transformation.

It is also possible to include the score associated with the estimated transformation. Typically, edges join node pairs corresponding to overlapping slices, but, in principle, they could join any pairs of nodes.

Figures 16A, 16B, 16C:
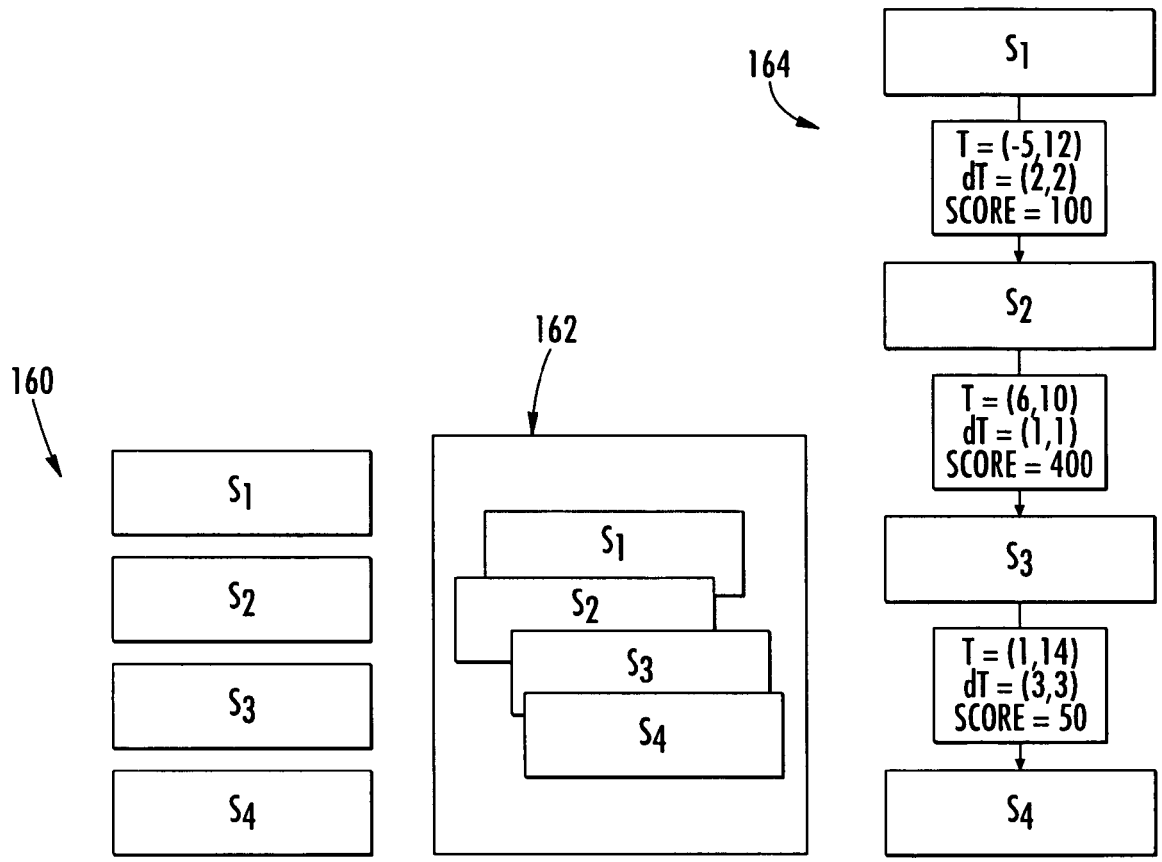
FIGS. 16A and 16B are schematic diagram representations of possible slide image representations according to the prior art.
FIG. 16C is a schematic diagram representation of a slide image representation using a logical finger biometric enrollment graph in accordance with the present invention.

A simple schematic example of a slice graph is explained with reference to FIGS. 16A-16C. FIG. 16A shows a sequence 160 of four slices as in the prior art, while FIG. 16B shows an image-based representation 162 based on the slices 160 as shown in FIG. 16A as in the prior art. In contrast, FIG. 16C shows a corresponding graph-based representations 164. In this example, the transformation model is a two-dimensional translation, represented by the tuple $T=(T_x,T_y)$. Its uncertainty is represented by $dT=(dT_x,dT_y)$, which can correspond to either simple bounds (i.e., actual $T=(T_x+/-dT_x, T_y+/-dT_y)$), or variances of probability density functions (PDFs) describing the uncertainties of $T_x$ and $T_y$.

Next described in greater detail is slice graph construction. A fundamental decision in slice-graph construction is the choice of the transformation model for slice alignment. The transformation model typically accounts for global vertical and horizontal translations, and possibly global rotation. It is also possible to add an extra level of complexity by attempting to account for non-linear local deformations as well.

Each node in the slice graph is associated with a slice image, possibly after the following operations:

Image enhancement for reducing noise content. This can be done using either adaptive or non-adaptive filtering techniques as will be appreciated by those skilled in the art.

Image warping to account for non-instantaneous sensor scanning as described above. Notice that this step depends on the speed-profile information. Accordingly, it takes place after the slices are aligned as described below.

3. Image warping to account for non-linear deformations. It may be desirable to explicitly warp the slice image to "undo" the effects of non-linear deformations, and then assume that the relative transformation between slices is global. This step may significantly simplify the management of alignment uncertainty.

Figures 17A, 17B:
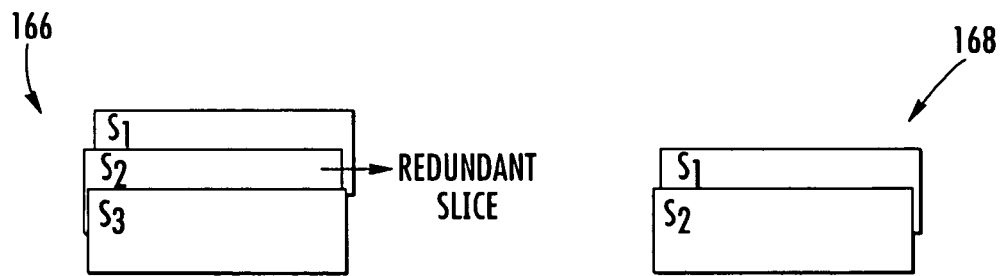
FIGS. 17A and 17B are schematic diagram representations of slice images illustrating removal of a redundant slice image in accordance with the present invention.

It is possible to store either the slice image, after processing, or some feature set extracted from it. The set of slice-graph nodes can correspond to either the whole sequence of image slices or a subsequence of it, e.g., the one obtained after eliminating redundant slices. A slice is considered redundant if it can be eliminated without loss of slice contiguity. An example is shown in FIGS. 17A and 17B wherein the sequence 166 is simplified by the removal of slice $s_2$ in the sequence 168 of FIG. 17B.

Edges carry uncertain alignment information among slices. By uncertain alignment, is meant relative transformation between two slices, and its uncertainty. Construction of a slice-graph edge involves two main processes, one to estimate the relative transformation between the two slices it connects, and the other to estimate the associated uncertainty. These processes are described in the next two sections.

Figure 18:
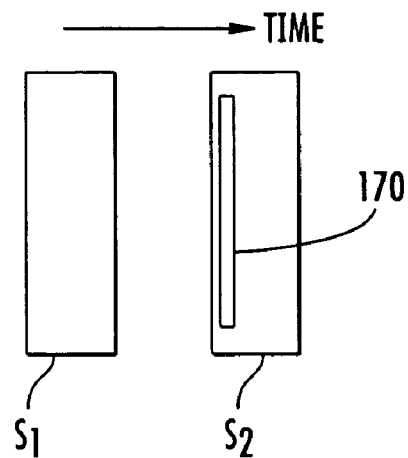
FIG. 18 is a schematic diagram representation of a sub-region used for correlation as may be used by the slide sensor of FIG. 15.

The transformation can be estimated based on any of the correlation techniques used for image registration, such as disclosed by L. Brown in A survey of image registration techniques, *ACM Computing Surveys*, vol. 24, no. 4, pp. 325-376, 1992. If the transformation is global, then a typical correlation technique will involve selecting a sub-region in one of the slices and correlating it with the other one within the allowed transformation space. The location and shape of the sub-region are chosen such that the correlation technique will work with minimal amount of slice overlap. A typical sub-region is a thin rectangular region (very few rows in height) located near the edge of the slice that is closest to the other one. An illustration of such a sub-region 170 is shown in FIG. 18. It is also conceivable to use such sub-region 170 to obtain an initial alignment, and then further expand it within the overlap area, in order to obtain more accurate alignment.

Local deformations, if it is desired to account for them, can be obtained by refining the global alignment as follows. A number of sub-regions in the overlapping area are selected and independently correlated within a small transformation subspace around the global transformation. The resulting transformations are used to construct a transformation map, which is a function whose independent variables are pixel locations in a slice, and dependent variables are transformation parameters. These parameters define a local transformation that each pixel in a slice has to undergo, in addition to the global transformation, to coincide with its corresponding pixel in the other slice. The deviations of the local transformations from the global one can be viewed as samples of the transformation map at the center locations of the selected sub-regions. The transformation map can be obtained from these samples using interpolation techniques (e.g., based on thin-plate splines, which were introduced by Bookstein in Principal warps: Thin-plate splines and their decomposition of deformations, IEEE Transactions of Pattern Analysis and Machine Intelligence, vol. 24, no. 7, pp. 567-585, 1989, for example,] and used in the context of minutia matching, such as by Bazen et al. in Fingerprint matching by thin-plate spline modeling of elastic deformations, Pattern Recognition, vol. 36, no. 8, pp. 1859-1867, 2003, for example. The entire contents of these articles are incorporated herein by reference.

It is also conceivable to design the correlation process such that it starts with several small sub-regions that are correlated independently, and then analyzing their relative locations to simultaneously determine both the global transformation, and the local transformation map. This approach is expected to be more time consuming than the one described earlier.

The correlation process can completely fail due to a number of reasons such as the slide speed is more than the allowable one, or the image quality is too poor. The simplest way of handling correlation failure is not to connect the nodes of respective two slices. In such a case, the slice graph can include several disconnected components. If this type of failure is not very common, then the alignment information can be roughly obtained through interpolation of the speed profile, as mentioned above. This approach can be described in detail as follows:

1. Consecutive slices are correlated to determine relative alignments between them.

2. Alignments obtained from successful correlations are used to determine samples of the speed profile at times of acquisition of respective slices.

3. The speed samples are described analytically through non-linear regression, which involves fitting a function (e.g., a polynomial) to the speed profile samples. The regression process can involve all speed samples, or only those around the missing sample locations.

4. The fingerprint speed at each missing sample location is directly determined from the fitted function. This speed is then used to align respective slice pairs.

Figure 19:
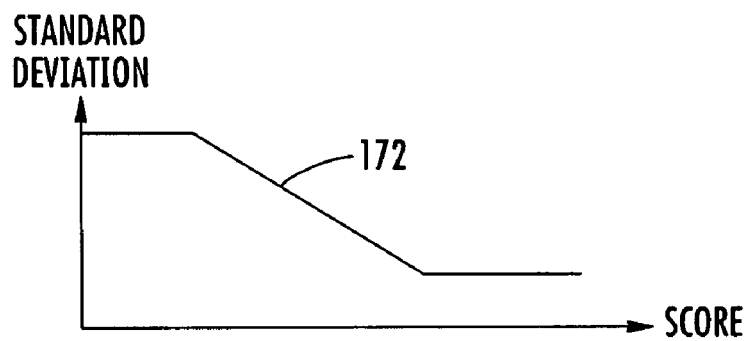
FIG. 19 is a graph of a function relating correlation score to standard deviation as may be used by the slide sensor of FIG. 15.

The uncertainty associated with a transformation can be represented statistically using a multivariate probability density function (PDF). The most commonly used distributions are the uniform and Gaussian PDFs. The mean of the uncertainty PDF is typically the estimated transformation. Its covariance matrix can be estimated using one of the following two ways. First, it can be determined as a function of the correlation score at the estimated transformation. Intuitively, the amount of uncertainty is inversely proportional to the score. Accordingly, the relationship between the score and the standard deviation associated with each transformation parameter is monotonically decreasing. One simple description of this relationship is a linear function with saturation, as depicted in the plot 172 relating correlation score to standard deviation shown in FIG. 19. The diagonal of the covariance matrix can then be obtained from the standard deviations of the transformation parameters. The off-diagonal entries can simply be set to zero, based on the simplifying assumption that the uncertainties of the transformation parameters are independent.

Second, it can be estimated based on the correlation score at the estimated transformation along with the scores at neighboring transformations. These scores form a multivariate function, where the independent variables correspond to the transformation parameters. The raw-score function is then mapped to a probabilistic-score function, such that the probabilistic score represents the likelihood of observing the correlation sub-region at a given location. The probabilistic-score function is then used to determine the covariance matrix through standard estimation techniques. A simplified instance of this scenario is described by Nickels et al. in Estimating uncertainty in SSD-based tracking, Image and Vision Computing, vol. 20, no. 1, pp 47-58, 2002, in the context of feature tracking in visual images. This article is also incorporated herein by reference in its entirety.

Note that the above two approaches assume that the correlation is successful. In case of correlation failure, the uncertainty covariance matrix can be set to a fixed matrix determined empirically. Notice that this situation arises when aligning slices through interpolation of the speed profile.

The process of matching two slice graphs, one obtained during enrollment and the other during matching is now described. These graphs are denoted by $G^E$ and $G^M$, respectively. Matching includes two major stages:

1. Graph Alignment: The purpose of this stage is to generate an initial reliable alignment between graphs $G^E$ and $G^M$. It is obtained by attempting to find a good match between a node in $G^E$ and another one in $G^M$.

2. Graph Matching: This stage performs detailed graph-to-graph matching between $G^E$ and $G^M$ at the alignment provided by the first stage. The output of this stage is a matching score, which estimates the similarity between the two graphs.

The straightforward approach for graph alignment is to exhaustively match each node in $G^E$ against every node in $G^M$, and then rank the enroll/match node pairs in a descending order based on the matching score. The complexity of exhaustive node-to-node matching is of order $O(n^E n^M)$, where $n^E$ and $n^M$ are the numbers of nodes in $G^E$ and $G^M$, respectively. Exhaustive matching may be undesirable, due to the high computational requirements. This problem can be mitigated by using an efficient method for coarse ranking of node pairs.

Figure 20:
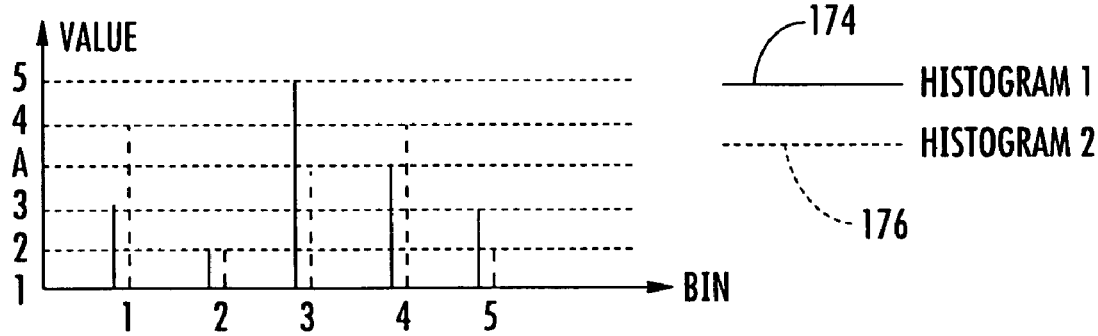
FIG. 20 is an example histogram comparison as may be used by the slide sensor of FIG. 15.

One possible ranking method is based on comparing histograms of low-level fingerprint features. Examples of these features are ridge orientation, ridge curvature and ridge frequency. The number of selected histogram features presents a trade-off between discriminative power on one hand, and both computational and space requirements on the other. The similarity between two histograms can be estimated by using criteria such as sum of minimum values. It is also possible to include a penalty term in the criterion to penalize for the differences between the corresponding values. An example is shown by the two histograms indicated by the solid and dashed lines 174, 176 in FIG. 20. In particular, FIG. 20 illustrates an example of a histogram comparison with a penalty. The sum of the minimum values=2+1+3+3+1=10. The sum of the minimum values with a penalty=10−k(2+0+2+1+1)=10−6k, where k is a constant to be determined, such as empirically. The output of the ranking method is an ordered list of $n^E \times n^M$ node pairs. Each pair is presented to a detailed matcher in order. Node-to-node detailed matching continues until one of the following conditions is satisfied, either the score returned by the matcher exceeds a threshold, which is set to indicate a minimum desired level of match confidence, or the number of matches exceeds some threshold. This threshold is the minimum number of node-to-node matches needed to almost guarantee that a reasonable node match will be found for same-finger matches.

Each match generates a score and corresponding uncertain alignment. This can be represented by a tuple $(N_i, M_j, S_{ij}, T_{ij}, dT_{ij})$, where $N_i$ and $M_j$ are the matched nodes in $G^E$ and $G^M$, respectively, $S_{ij}$ is the matching score, $T_{ij}$ is the transformation of $N_i$ relative to $M_j$ and $dT_{ij}$ is the uncertainty associated with $T_{ij}$. The tuple corresponding to the highest score, denoted by $(N_u, M_v, S_{uv}, T_{uv}, dT_{uv})$, is selected. If such a score, $S_{uv}$, is lower than some threshold, then graph-to-graph matching is declared to be a failure.

Figure 21:
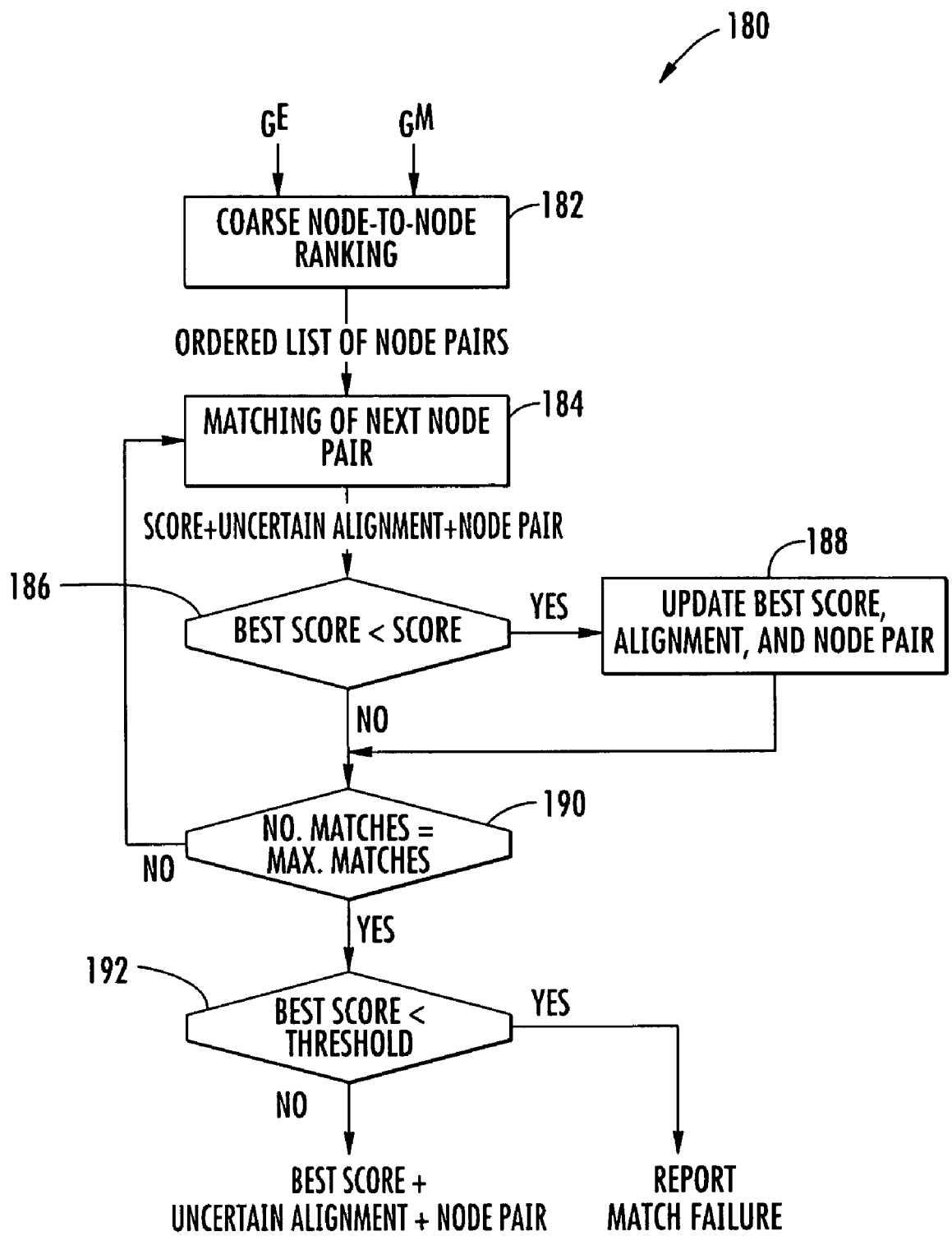
FIG. 21 is a flowchart of a graph-alignment stage as may be used by the slide sensor of FIG. 15.

A flowchart 180 Block diagram of the graph-alignment stage is shown in FIG. 21 wherein coarse node-to-node ranking is performed at Block 182 followed by matching of a next node pair at Block 184. At Block 186 a best score is compared to the score obtained at Block 184, and if less the best score is updated at Block 188. If greater, then the no of matches is compared to a number of maximum matches at Block 190. If the number of matches equals the maximum number, the best score is compared to a threshold at Block 192. If the number of matches does not equal the maximum number of matches at Block 190, then the method returns to Block 184. If the comparison of the best score to the threshold at Block 192 indicates that the best score is less than the threshold score, a match failure is reported, and if not, the best+uncertain alignment+node pair is reported.

The graph matching stage expands the best node-to-node match obtained in the first stage to a full match between graphs $G^E$ and $G^M$. It is based on iterative node-to-graph matching of nodes in one graph against the other one. The node-to-graph matching, in turn, is based on iterative node-to-node matching. In all cases, matching is constrained by the best uncertain alignment obtained in the first step. The steps of the graph-matching algorithm can be described as follows:

1. Construction of Uncertain Alignment List: The objective of this step is to determine the uncertain alignment between every node $N_i$ in $G^E$ and node $M_v$ in $G^M$. This is done by utilizing the best uncertain alignment determined in the graph-alignment stage, represented by $(N_u, M_v, S_{uv}, T_{uv}, dT_{uv})$, as well as the edge information in graph $G^E$. The process starts from the seed alignment between $N_u$ and $M_v$ $(T_{uv}, dT_{uv})$. This alignment is recursively propagated to the other nodes in $G^E$. That is, the alignments of the immediate neighbors of $N_u$ are first calculated followed by their neighbors and so on. For example, assume that the uncertain alignment of $N_{u+1}$ relative to $N_u$ is $(T_1, dT_1)$, the transformation space is a 2-D translation (vertical and horizontal translations), and the transformation uncertainty is the covariance matrix of the two translation parameters. Then, the alignment of $N_{u+1}$ with respect to node $M_v$ is $(T_1+T_{uv}, dT_1+dT_{uv})$. Furthermore, if the uncertain alignment of $N_{u+2}$ relative to $N_{u+1}$ is $(T_2, dT_2)$, then the alignment of $N_{u+1}$ with respect to $M_v$ is $(T_1+T_2+T_{uv}, dT_1+dT_2+dT_{uv})$, and so on.

2. Constrained Node-to-Graph Matching: Each node in $G^E$, $N_i$, is matched with graph $G^M$. The matching between $N_i$ and $G^M$ is constrained by the uncertain alignment between $N_i$ and $M_v$, determined in the previous step. In particular, the uncertainty covariance matrix is used to constrain the search in the transformation space by limiting it to a small subspace that captures most of the probability density of the uncertainty PDF. The node-to-graph matching step can be described as follows:

A. Node $N_i$ is matched with individual nodes of $G^M$ that might overlap with it. This node-to-node matching continues until a match with a reasonable score is obtained, or all nodes in $G^M$ are exhausted. Note that $N_i$ is expected to have significant overlap with at most two nodes in $G^M$. This is because the matching is constrained, and all slice-graph nodes have the same size. The output of this step is a tuple $(N_i, M_w, S_{iw}, T_{iw}, dT_{iw})$ where $M_w$ is the node in $G^M$ generating the highest score.

B. The node-to-node match $(N_i, M_w, S_{iw}, T_{iw}, dT_{iw})$ obtained in the previous step is expanded to other nodes in $G^M$. Firstly, features in $N_i$ overlapping with $M_w$ are deleted to avoid matching them more than once. Secondly, the uncertain alignment between $N_i$ and each node in $G^M$ that overlap with it is estimated in a fashion similar to that described earlier in step A. Thirdly, $N_i$ is successively matched with each other overlapping node $M_j$, where the matching is constrained by the uncertain alignment between $N_i$ and $M_j$. As before, features of $N_i$ overlapping with $M_j$ are deleted to prevent double matching. Fourthly, the generated node-to-node scores, $\{S_{ij}\}$, are combined to form a node-to-graph score, $S_i$. Details of the score combination process are matcher dependent. One possible simple scheme is summing up the node-to-node scores (i.e., $S_i = \Sigma S_{ij}$).

Figure 22A:
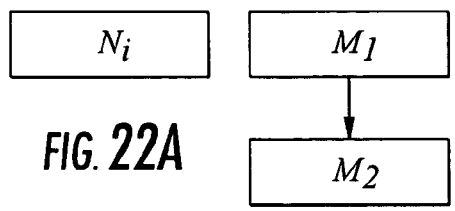
Figure 22B:
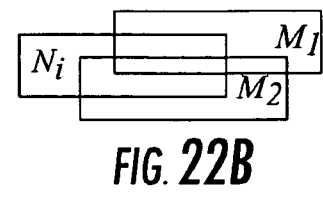
Figure 22D:
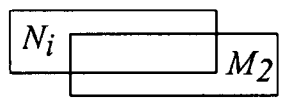
Figure 22D:
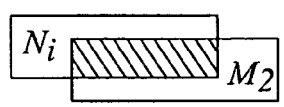
Figure 22E:
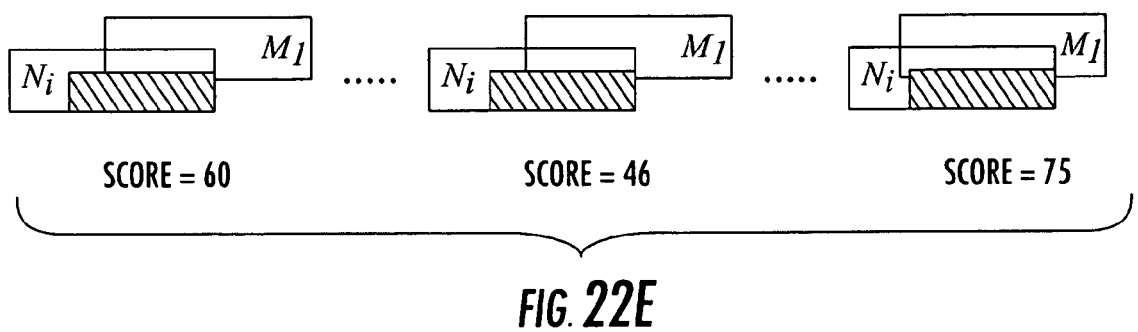

An example of node-to-graph matching is shown in FIGS. 22A-22E. FIG. 22A shows an enroll node $N_i$ and match slide graph $G^M$, including two nodes $M_1$ and $M_2$. FIG. 22b shows alignment among the nodes $N_i$, $M_1$ and $M_2$. FIG. 22C illustrates that node-to-node matching of $N_i$ and $M_2$ generates a score of 200. Features that overlap with features in node $M_2$ are deleted as shown by the hashed area of FIG. 22D. FIG. 22E shows the node $N_i$ matched with $M_1$ at various relative transformations determined by the uncertain alignment between $N_i$ and $M_1$. The highest score is found to be 75. Assuming a node-to-graph score is the sum of the node-to-node scores, the result of matching $N_i$ against the slide graph $(M_1, M_2)$ is 200+75=275.

To prevent matching features of nodes in $G^E$ more than once, the feature set of each node, $N_i$, is first pruned to eliminate features overlapping with previously matched nodes of $G^E$. This pruning step is needed before node-to-graph matching to prevent the same features from being used more than once in the graph-to-graph matching step.

3. Graph-to-Graph Matching: The purpose of graph-to-graph matching is the generation of a score that evaluates the similarity between the two graphs. This graph-to-graph score is a function of the set of node-to-graph scores $\{S_i\}$ obtained in the previous step. As stated before, the combination process depends on the matcher used. One possible combination scenario is summing up the node-to-graph scores (i.e., $S = \Sigma S_i$). A complete example of graph-to-graph matching, starting from graph alignment, is shown in FIGS. 23A-23G.

More particularly, FIG. 23A illustrates two slice graphs, FIG. 23B illustrates alignment information between the two graphs, and FIG. 23C illustrates coarse scores of the four possible node-to-node matches with the pair $(N_1, M_2)$ getting the highest coarse score. Continuing, FIG. 23D shows node $N_1$ matches against $M_2$ generating a reliable score of 250. FIG. 23E shows node $N_1$ matched against $(M_1, M_2)$ and generating a node-to-graph score of 340. FIG. 23F shows the features of $N_2$ overlapping with $N_1$ as indicated with hashing that are deleted. FIG. 23G shows node $N_2$ matched against $(M_1, M_2)$ with the generated node-to-graph score of 170. Assuming a graph-to-graph score is the sum of the node-to-graph scores, then the result of matching graph $(N_1, N_2)$ to graph $(M_1, M_2)$ is 340+170=510.

In the algorithm described above, it is assumed that the graph-alignment stage provides only a single possible alignment to the graph-matching stage. It is also conceivable that several potential alignments are generated to be examined by the graph-matching stage. In such a case, the graph-to-graph matching score is simply the maximum of the generated scores. Regarding the nature of the slice graphs, the algorithm presented above implicitly assumes that the each slice graph includes a single connected component. However, as described above, it is possible that a slice graph will have several connected components.

It is important to note that the algorithm will also work on slice graphs with several connected components. The difference is that the graph-alignment stage will provide a promising alignment between a connected component in $G^E$ and another one in $G^M$. Providing several alignments will allow the examination of several promising matches between connected components in $G^E$ and $G^M$. If it is desired to examine each pair of connected components, then the above algorithm could just be applied to each pair of connected components independently. The overall graph-to-graph score in this scenario would be the maximum of the obtained scores.

Another modification is directed to the construction of the uncertain alignment list. The above algorithm assumes that the alignment list is constructed before matching begins. The potential limitation of this approach is that the uncertainty grows as a function of the distance between the node under consideration and the base node ($N_u$). This potential problem can be mitigated by interleaving uncertain alignment estimation and matching. In particular, the uncertain alignment is first estimated for only the immediate neighbors of $N_u$. Node-to-graph matching then proceeds by using $N_u$ and its neighboring ones only. The results of the matching are used to determine the alignment uncertainty of the next neighbors, which are then matched against $G^M$, and so on.

Figures 24A, 24B, 24C, 24D:
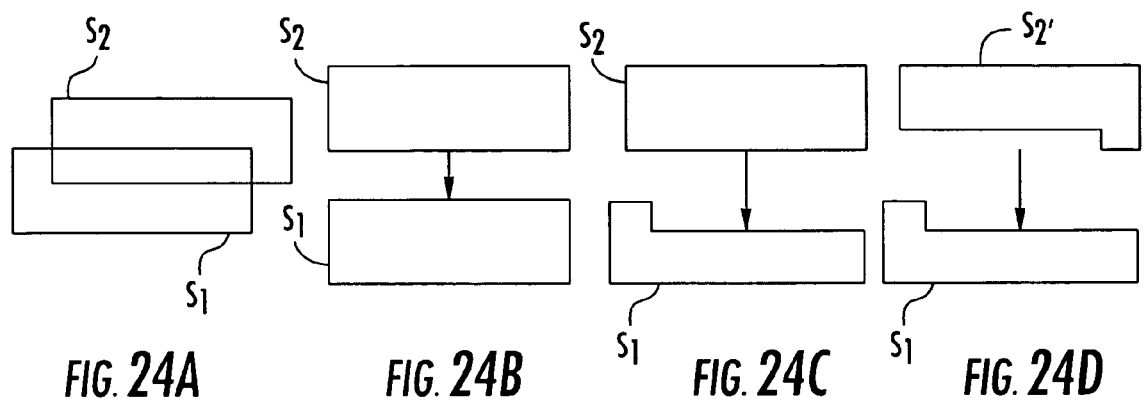
FIGS. 24A-24D are schematic diagram representations for redundancy removal as may be used by the slide sensor of FIG. 15.

An additional modification involves information redundancy in the slice graph. Each node corresponds to a slice image. Accordingly, there is redundant information in consecutive nodes, corresponding to the overlapping areas of slice images. The amount of redundancy can be considerably reduced by selecting the minimum number of slices such that contiguity is preserved. The remaining redundancy can be eliminated by storing features in overlapping areas only once. An illustration of this concept is shown in FIGS. 24A-24D. FIG. 24A shows two overlapping slices $s_1$, $s_2$. FIG. 24B shows the corresponding slice graph with redundancy. FIG. 24C shows a potential corresponding slice graph without redundancy, while FIG. 24D shows another potential slice graph without redundancy.

The previous sections describe how to construct the slice graph from a raw sequence of slices, and showed how to use them for matching. In a typical scenario, the slice graph would include many nodes depending on the length of the finger slide. The number of nodes could be up to 50 or even more. Matching of slice graphs of this size tend to be complicated and time consuming. One possible way of mitigating this problem is to increase the node granularity from slices to segments. A segment can be viewed as a "super slice". It is constructed by grouping few consecutive slices into a single partial image using the alignment information between them. The feature set used for matching is then extracted from the partial image. Alternatively, features could be extracted from each slice and then slice feature sets are physically grouped to form the segment feature set. The resulting sequence of segments is then used to form a new graph, referred to as a segment graph. Nodes in this graph correspond to individual segments, while edges carry uncertain alignment information among segments.

Segments-graph nodes are constructed by grouping slices into segments. The number of slices per segment can be selected in a number of ways. Some of the simple ways are attempting to maintain a fixed number of slices per segment, or a fixed segment-image length. These criteria cannot always be followed (e.g., when constructing a last segment of a slice sequence, or a last segment before a break in slice graph). It is also conceivable to adopt an intelligent scheme for segment-selection based on the uncertainty profile. The uncertainty profile of a slice sequence is a discrete function where the independent variable denotes a pair of consecutive slices, and the dependent variable is a measure of the uncertainty in the alignment between them.

Figure 25:
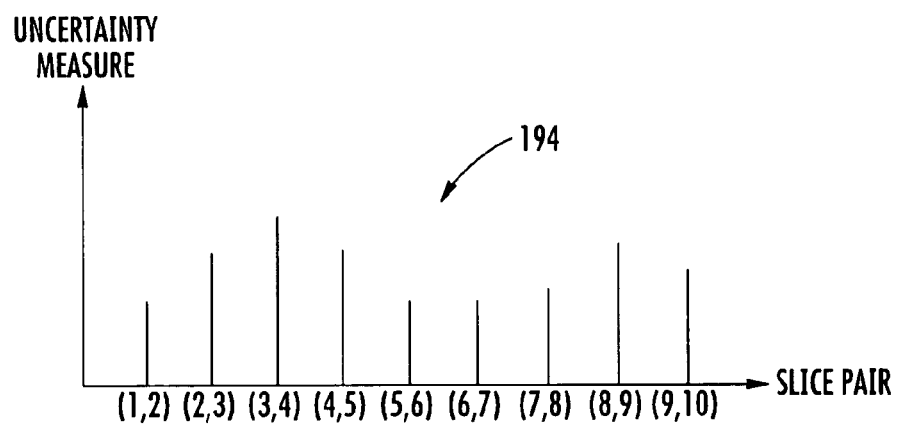
FIG. 25 is a graph of an uncertainty profile as may be used by the slide sensor of FIG. 15.

Examples of these measures are the trace or determinant of the uncertainty covariance matrix. FIG. 25 shows an example of the uncertainty profile 194. Note that if two consecutive slices are not connected in the slice graph, then the corresponding uncertainty measure can be set to infinity (or a very high number). Segments can be selected from the uncertainty profile using a variety of criteria such as each segment has the same amount of accumulated uncertainty (e.g., sum or product of individual uncertainty measures), or each segment stretches between two consecutive local maxima. Applying this criterion to the uncertainty profile 194 shown in FIG. 25, three segments (1,2,3), (4,5,6,7,8) and (9,10) are obtained. This is because this profile has two local maxima at (3,4) and (8,9).

It is also possible to use a mixed criterion. An example of a mixed criterion is that a segment stretches between two consecutive local maxima such that the length of its partial image is within given bounds.

Construction of segment-graph edges is somewhat complicated. This is because the alignment uncertainty carried by an edge has to account for the alignment uncertainty between the two "border" slices of the two segments incident to the edge (as in the slice-graph case), and the alignment uncertainty within each segment, since it has been ignored when constructing the segment.

The process starts by estimating the uncertain alignment between consecutive slices as described above. This is followed by accumulating the uncertainties within each segment to form a composite uncertainty. This composite uncertainty is then distributed, such as evenly, among the edges incident to the segment. FIGS. 26A-26D show an example of segment-graph construction from a sequence of slices. FIG. 26A shows the initial sequence of six slices $s_1$-$s_6$, FIG. 26B shows the six slices after alignment, FIG. 26C shows the corresponding slice graph, and FIG. 26D shows the corresponding segment graph includes three segments $SEG_1$-$SEG_3$ where every segment corresponds to two slices.

For clarity of explanation, the term segment has been used to represent a combination of slices. Considered in other terms the finger biometric enrollment data sets could comprise subsets that are, in turn, smaller data sets combined as described. Accordingly, the term finger biometric enrollment data set is also meant to include a segment data set as will be appreciated by those skilled in the art.

The algorithm used to match segment graphs is identical to the one used for slice-graph matching, described above. However, the behavior of the algorithm is expected to be different both in terms of speed and recognition accuracy. Segment-graph matching is expected to be faster than slice-graph matching because of the fewer average number of nodes per graph. As for recognition accuracy, ignoring the uncertainty among segment slices fundamentally degrades the performance of segment-graph matching, where the extent of degradation is proportional to the amount of ignored uncertainty. On the other hand, increasing the node granularity from a slice, which typically has very few rows, to a segment tends to improve the reliability of node-to-node matching, which favors segment-graph matching over slide-graph matching.

Additional features of the invention may be found in co-pending applications entitled SPOT-BASED FINGER BIOMETRIC PROCESSING METHOD AND ASSOCIATED SENSOR, Ser No. 10/957,331; and METHODS FOR MATCHING RIDGE ORIENTATION CHARACTERISTIC MAPS AND ASSOCIATED FINGER BIOMETRIC SENSOR, Ser. No. 10/957,335, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for finger biometric processing comprising:
generating more than one pair of finger biometric enrollment data sets based upon successive placements of a user's finger upon a finger biometric touch sensor;
generating a respective estimated physical transformation between each pair of finger biometric enrollment data sets;
generating a respective uncertainty for each estimated physical transformation; and
associating the respective estimated physical transformation and the respective uncertainty with each pair of finger biometric enrollment data sets to define a logical finger biometric enrollment graph.

2. A method according to claim 1 further comprising generating a respective confidence score for an alignment between each pair of finger biometric enrollment data sets; and wherein associating further comprises associating the respective confidence score with each pair of finger biometric enrollment data sets to further define the logical finger biometric enrollment graph.

3. A method according to claim 1 further comprising: generating more than one finger biometric verify data set; and comparing each of the finger biometric verify data set with the logical finger biometric enrollment graph to determine a match therewith.

4. A method according to claim 3 wherein comparing comprises: determining which finger biometric enrollment data set produces a highest match value with each finger biometric verify data set thereby defining an anchor node of the logical finger biometric enrollment graph; and determining a match score between each finger biometric verify data set and at least one other finger biometric enrollment data set.

5. A method according to claim 4 further comprising removing redundant data of the anchor node from the more than one other finger biometric enrollment data set prior to determining the match score.

6. A method according to claim 1 wherein the more than one pair of finger biometric enrollment data sets are generated based upon sliding placement of a user's finger upon a finger biometric slide sensor that generates a series of finger biometric enrollment data sets during sliding.

7. A method according to claim 6 further comprising:
generating a series of finger biometric verify data sets using the finger biometric slide sensor;
generating a respective estimated physical transformation between each pair of finger biometric verify data sets;
generating a respective uncertainty for each estimated physical transformation; and
associating the respective estimated physical transformation and the respective uncertainty with each of the finger biometric verify data sets to define a logical finger biometric verify graph.

8. A method according to claim 7 wherein generating the respective uncertainty for each estimated physical transformation between each pair of the finger biometric verify data sets comprises using more than one uniform and Gaussian probability distribution function.

9. A method according to claim 7 further comprising generating an initial alignment between the logical finger biometric enrollment graph and the logical finger biometric verify graph.

10. A method according to claim 9 further comprising comparing the logical finger biometric verify graph with the logical finger biometric enrollment graph based upon the initial alignment to determine a match therewith.

11. A method according to claim 10, further comprising removing redundant data from more than one of the logical finger biometric enrollment graph and logical finger biometric verify graph.

12. A method according to claim 10, wherein comparing the logical finger biometric verify graph with the logical finger biometric enrollment graph comprises:
generating a respective uncertainty in alignment between more than one node in the logical finger biometric verify graph and at least one node in the logical finger biometric enrollment graph;
performing constrained node-to-graph matching based upon the respective uncertainty in alignment; and
generating an overall graph matching score based upon the constrained node-to-graph matching.

13. A method according to claim 1 wherein generating the respective estimated physical transformation comprises correlating respective sub-regions in each pair of finger biometric enrollment data sets.

14. A method according to claim 1 wherein each finger biometric enrollment data set comprises a finger biometric enrollment image data set, and further comprising subjecting each finger biometric enrollment image data set to at least one of image enhancement for reducing noise content, and image warping to account or non-instantaneous sensor operation or non-linear deformations.

15. A method according to claim 1 wherein the respective estimated physical transformation comprises at least one of a horizontal translation, a vertical translation, and a rotation.

16. A method according to claim 1 wherein each finger biometric enrollment data set comprises more than one of a finger image data set and a finger biometric feature set.

17. A method according to claim 1 wherein each finger biometric enrollment data set comprises a combination of finger biometric enrollment data subsets.

18. A method according to claim 1, wherein generating the respective estimated physical transformations is based upon alignment of respective edges of each pair of finger biometric enrollment data sets.

19. A method according to claim 1 wherein each pair of finger biometric enrollment data sets is generated by an integrated circuit finger biometric sensor.

20. A method for processing a plurality of finger biometric data sets comprising:
generating more than one pair of finger biometric data sets based upon successive placements of a user's finger upon an integrated circuit finger biometric sensor;
generating a respective estimated physical transformation between each pair of finger biometric data sets;
generating a respective uncertainty for each estimated physical transformation; and
associating the respective estimated physical transformation and the respective uncertainty with each pair of finger biometric data sets to define a logical finger biometric graph.

21. A method according to claim 20, further comprising generating a respective confidence score for an alignment between each pair of finger biometric data sets; and wherein associating further comprises associating the respective confidence score with each pair of finger biometric data sets to define the logical finger biometric graph.

22. A method according to claim 20 wherein the respective estimated physical transformation comprises at least one of a horizontal translation, a vertical translation, and a rotation.

23. A method according to claim 20, wherein each finger biometric data set comprises more than one of a finger image data set and a finger biometric feature set.

24. A method according to claim 20, wherein generating the respective estimated physical transformation is based upon alignment of respective edges of each pair of finger biometric data sets.

* * * * *

UNITED STATES PATENT AND TRADEMARK OFFICE
CERTIFICATE OF CORRECTION

PATENT NO. : 7,616,787 B2
APPLICATION NO. : 10/956491
DATED : November 10, 2009
INVENTOR(S) : Boshra It is certified that error appears in the above-identified patent and that said Letters Patent is hereby corrected as shown below:

| | |
|---|---|
| Column 6, Line 55 | Delete: "or" <br> Insert: --for-- |
| Column 11, Line 60 | Delete: "may of" <br> Insert: --may be of-- |
| Column 14, Line 1 | Delete: ",]" <br> Insert: --)-- |
| Column 16, Line 2 | Delete: "no" <br> Insert: --number-- |

Signed and Sealed this

Twenty-eighth Day of September, 2010

David J. Kappos
*Director of the United States Patent and Trademark Office*